United States Patent
Oh et al.

(10) Patent No.: US 12,533,966 B2
(45) Date of Patent: Jan. 27, 2026

(54) METHOD OF CONTROLLING DRIVE SYSTEM TORQUE OF ELECTRIC VEHICLE

(71) Applicants: Hyundai Motor Company, Seoul (KR); Kia Corporation, Seoul (KR)

(72) Inventors: Ji Won Oh, Hwaseong-Si (KR); Ho Wook Lee, Seoul (KR); Jeong Soo Eo, Hwaseong-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 214 days.

(21) Appl. No.: 18/385,139

(22) Filed: Oct. 30, 2023

(65) Prior Publication Data

US 2024/0416762 A1     Dec. 19, 2024

(30) Foreign Application Priority Data

Jun. 19, 2023    (KR) .................. 10-2023-0077847

(51) Int. Cl.
    *B60L 15/20*       (2006.01)
(52) U.S. Cl.
    CPC ................... *B60L 15/2036* (2013.01)
(58) Field of Classification Search
    CPC ...... B60L 15/2036; B60L 15/20; B60L 15/10; B60L 2240/423; B60L 2260/26; B60L 2260/40; Y02T 10/72; Y02T 10/64; B60Y 2200/91; B60Y 2306/09
See application file for complete search history.

(56) References Cited

U.S. PATENT DOCUMENTS

| | | | | |
|---|---|---|---|---|
| 5,631,829 A | * | 5/1997 | Takasaki | B60K 23/0808 701/1 |
| 5,752,211 A | * | 5/1998 | Takasaki | B60K 23/0808 701/88 |
| 6,528,959 B2 | * | 3/2003 | Kitano | B60T 8/1769 318/58 |
| 6,909,959 B2 | * | 6/2005 | Hallowell | B60W 30/02 701/91 |
| 2018/0312078 A1 | * | 11/2018 | Message | B60L 15/2063 |
| 2025/0065881 A1 | * | 2/2025 | Shen | B60W 30/20 |

FOREIGN PATENT DOCUMENTS

| | | |
|---|---|---|
| KR | 20140049638 A | 4/2014 |
| KR | 101704243 B1 | 2/2017 |
| KR | 20220096746 A | 7/2022 |

\* cited by examiner

*Primary Examiner* — Gertrude Arthur Jeanglaude
(74) *Attorney, Agent, or Firm* — MORGAN, LEWIS & BOCKIUS LLP

(57) ABSTRACT

A method of controlling a driving system torque of an electric vehicle includes limiting, by a controller, a slope of a front wheel torque command for front wheel torque control and a slope of a rear wheel torque command for rear wheel torque control by a slope limit value determined according to a vehicle driving state in a mode transition process in which a torque control mode upon travel of a vehicle is switched from one mode selected among a responsiveness priority mode and a power priority mode to another mode among the responsiveness priority mode and the power priority mode.

20 Claims, 10 Drawing Sheets

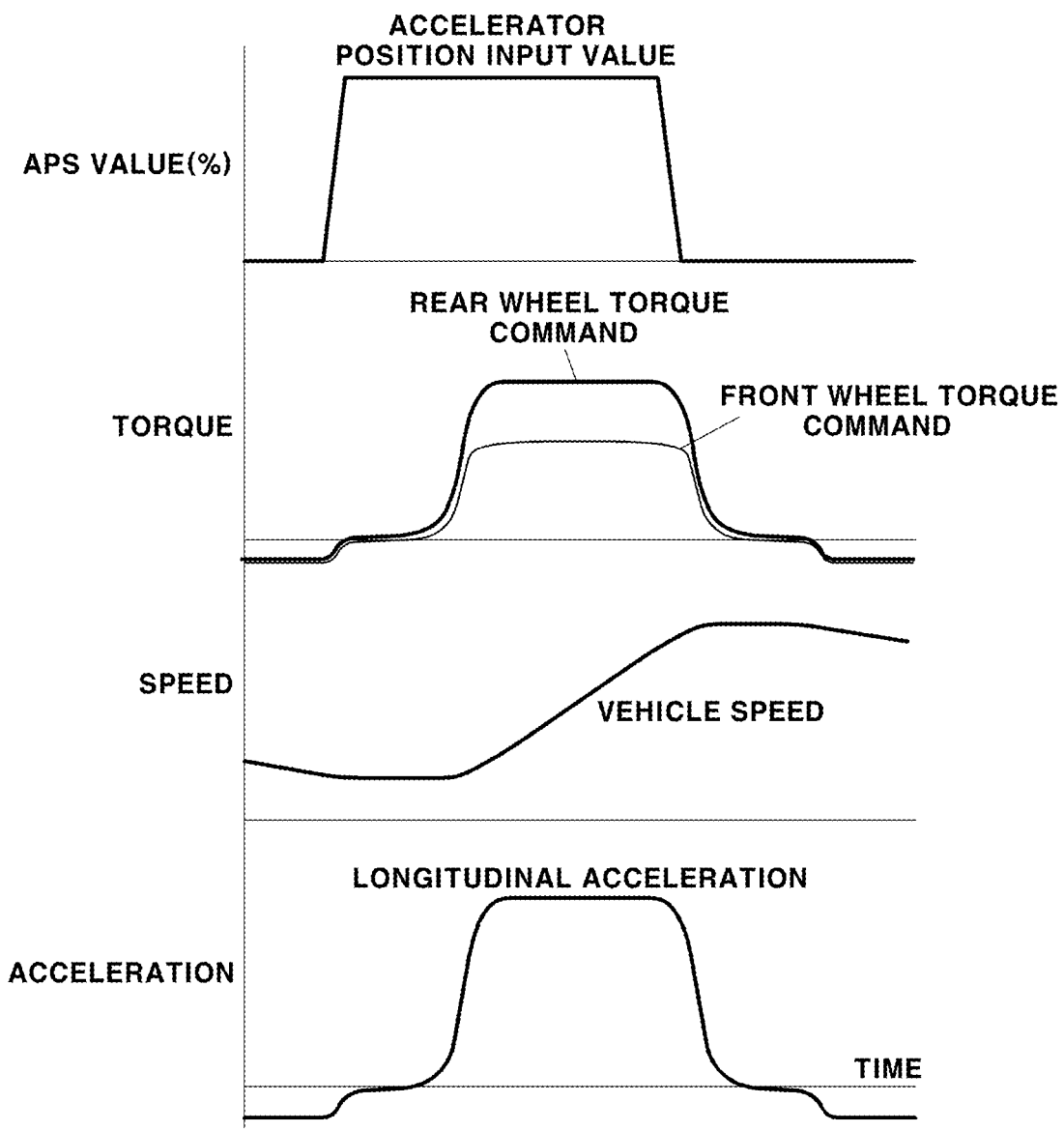

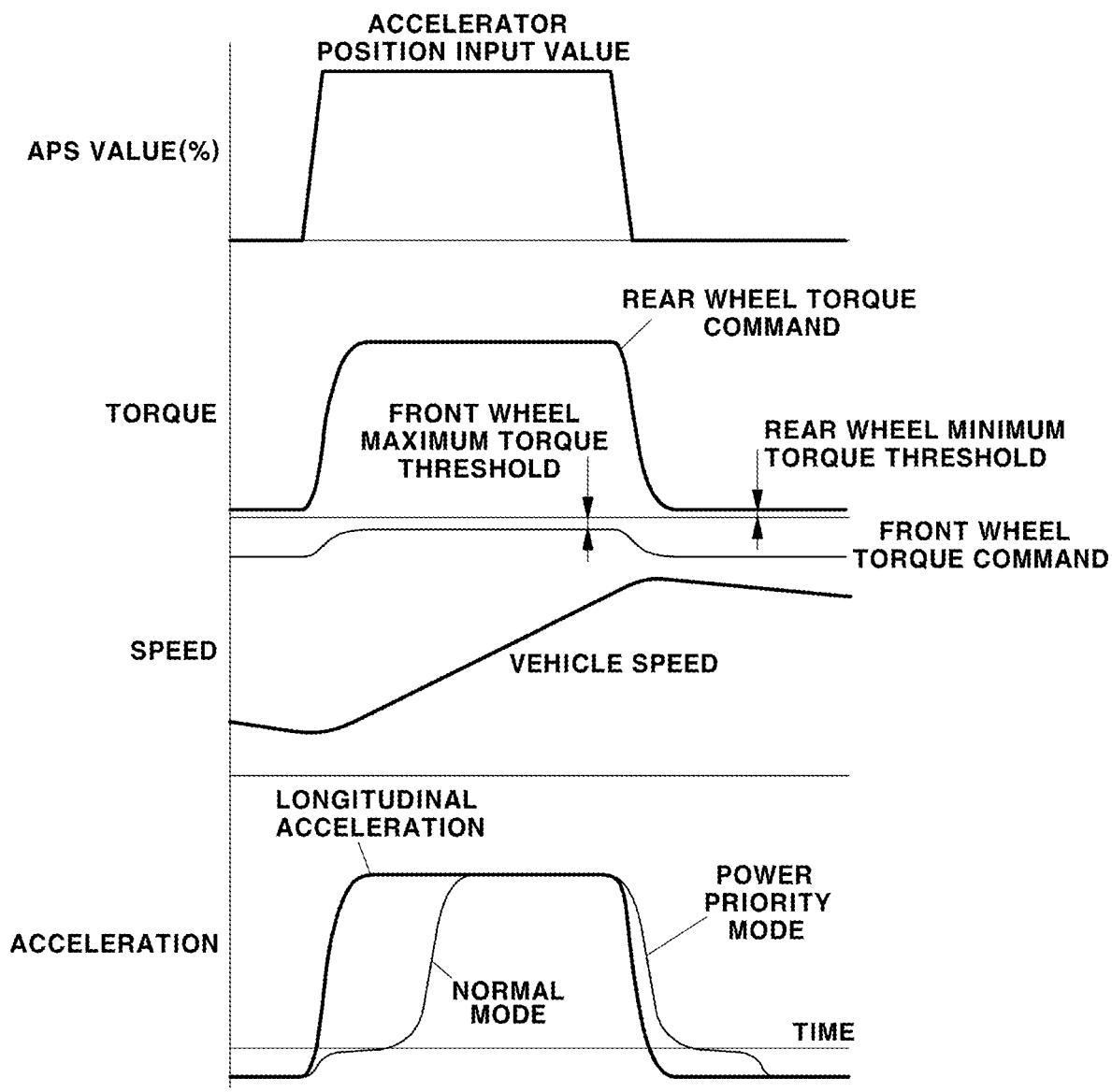

METHOD OF CONTROLLING DRIVE SYSTEM TORQUE OF ELECTRIC VEHICLE

CROSS-REFERENCE TO RELATED APPLICATION

The present application claims priority to Korean Patent Application No. 10-2023-0077847 filed on Jun. 19, 2023, the entire contents of which is incorporated herein for all purposes by this reference.

BACKGROUND OF THE PRESENT DISCLOSURE

Field of the Present Disclosure

The present disclosure relates to a method of controlling a driving system torque of an electric vehicle, and more specifically, to a method of controlling a torque capable of generating a torque by evading a backlash band of a driving system of an electric vehicle.

Description of Related Art

In general, a driving system of a vehicle should generate an appropriate torque according to a torque command determined by a driver's driving input value (e.g., an accelerator pedal input value or a brake pedal input value) or a request of an advanced driver assistance system (ADAS).

In the instant case, when a torque change rate is set too high, problems such as the torsion of a driveshaft, the strike of a gear backlash, or the degradation of drivability caused by an impact due to rapidly changing torque occur.

Conversely, when the torque change rate is limited too small, it takes an excessive time to provide a torque required by a driver or a controller of the ADAS, and an actual behavior of a vehicle may differ from the driver's intention, causing frustrating responsiveness or dangerous situations.

As described above, a degree of a reduction in noise, vibration, and harshness (NVH) in the vehicle due to a rapid torque change and a degree of securing the acceleration/deceleration responsiveness of the vehicle have a trade-off relationship.

In current mass-produced vehicles, slope limiting and filters using various conditions as factors are used to generate an optimal torque command capable of resolving the trade-off relationship.

Furthermore, in electrified vehicles using a motor as a driving source or a part of the driving source, active feedback torque correction control capable of suppressing vibration that has already occurred using the motor is also applied in some cases.

However, even when advanced backlash post-correction control is applied, it is difficult to suppress a problem of degrading vehicle responsiveness, which inevitably occurs chronically due to the characteristics of hardware. Moreover, the noise, vibration, and harshness (NVH) issues due to backlash frequently occur in electric vehicles with few vibration damping elements in the driving system.

A related art discloses a method of generating a model speed of a driveshaft using a disturbance observer and reducing vibration using a deviation between the model speed and an actual speed of the driveshaft. In the related art, a method of calculating the model speed based on a wheel speed instead of the disturbance observer in the method of determining the model speed is disclosed.

Furthermore, a related art discloses a method of generating a model speed of a motor using an input torque model and reducing vibration using a deviation between the model speed and an actual speed of the motor.

Furthermore, a related art discloses a method of estimating a speed of a driving system using a torque model and determining a slope of a torque command using a speed difference between an actual speed and an estimated speed of a driving system.

However, all of the related art only suggest a method of correcting a torque for reducing and suppressing vibration generated in a driving system and do not suggest a method of determining a torque capable of preventing the occurrence of vibration itself.

Therefore, in relation to the backlash of the driving system, a control method capable of generating a torque command by evading a backlash band in which the backlash of the driving system may occur rather than a control method of alleviating the problem caused by the backlash is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of generating a torque command of a driving system of an electric vehicle and controlling a torque of the driving system, which may be configured to generate a torque by evading a backlash band to prevent the occurrence of backlash in the driving system.

An object of the present disclosure is not limited to the above-described object, and other objects that are not mentioned will be able to be clearly understood by those skilled in the art to which the present disclosure pertains (hereinafter referred to as "those skilled in the art") from the following description.

according to an exemplary embodiment of the present disclosure, provided is a method of controlling a driving system torque of an electric vehicle including limiting, by a controller, a slope of a front wheel torque command for front wheel torque control and a slope of a rear wheel torque command for rear wheel torque control by a slope limit value determined according to a vehicle driving state in a mode transition process in which a torque control mode upon travel of a vehicle is switched from one mode selected among a responsiveness priority mode and a power priority mode to another mode among the responsiveness priority mode and the power priority mode, wherein the responsiveness priority mode is a mode in which the front wheel torque control and the rear wheel torque control are performed by the controller using the front wheel torque command and the rear wheel torque command for evading a backlash band, which is a torque region in which backlash of a driving system in the vehicle is generated, and the power priority mode is a mode in which the front wheel torque control and the rear wheel torque control are performed by the controller using the front wheel torque command and the rear wheel torque command distributing an entire torque command required for travel of the vehicle according to a front and rear wheel distribution ratio.

Therefore, according to the method for controlling the torque of the driving system of the electric vehicle according to an exemplary embodiment of the present disclosure, it is possible to prevent the occurrence of backlash itself while the motor is used only in a torque region irrespective of backlash while the backlash band evasion control is executed.

Furthermore, it is possible to effectively solve the problems of backlash vibration, noises, and impact, perform the motor control specialized for the high-performance driving mode, improve the vehicle turning performance, and greatly improve the longitudinal responsiveness of the vehicle as the occurrence of the torque is possible without worrying about the backlash problem.

Furthermore, it is possible to provide the driving mode emphasizing direct connection for the high-performance electric vehicle only, improve the convenience and accuracy of the load movement control during track turning, and improve the ease of the use of the special driving mode such as a drift mode.

In an exemplary embodiment of the present disclosure, it is possible to reduce a sudden torque change during mode transition between a responsiveness priority mode (backlash region evasion mode) in which backlash region evasion control and throttle balancing assist control are performed and the power priority mode (normal mode), which is the existing torque control mode and minimize the instability of a vehicle behavior and the occurrence of the impact.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5A is a view exemplarily illustrating a control state in a power priority mode in the exemplary embodiment of the present disclosure;

FIG. 5B is a view exemplarily illustrating a control state in a responsiveness priority mode in the exemplary embodiment of the present disclosure;

Figure 1:
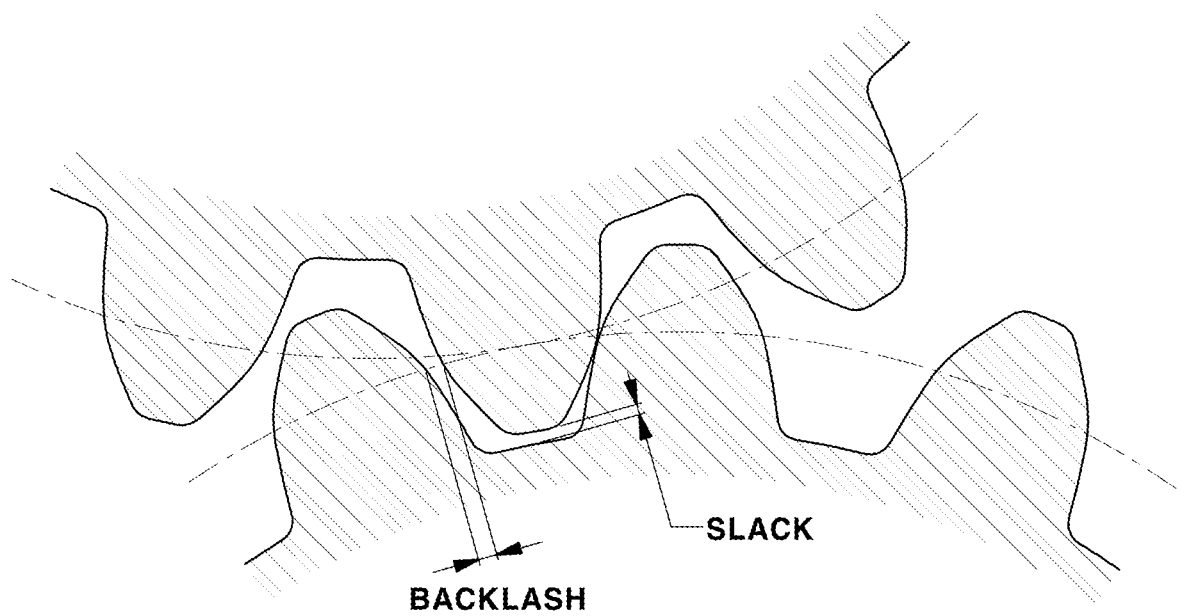
FIG. 1 is a view exemplarily illustrating backlash.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in section by the particularly intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. Specific structural or functional descriptions presented in the exemplary embodiments of the present disclosure are merely exemplified for describing the exemplary embodiments according to the concept of the present disclosure, and the exemplary embodiments according to the concept of the present disclosure may be implemented in various forms. Furthermore, the present disclosure should not be construed as being limited by the exemplary embodiments described in the specification, and it should be understood that the present disclosure includes all modifications, equivalents, or substitutes included in the spirit and technical scope of the present disclosure.

Meanwhile, in an exemplary embodiment of the present disclosure, terms such as first and/or second may be used to describe various components, but the components are not limited by the terms. The above terms are used only for distinguishing one component from another, for example, without departing from the scope of the present disclosure according to the concept of the present disclosure, and a first component may be referred to as a second component, and similarly, the second component may also be referred to as the first component.

When a certain component is described as being "connected" or "coupled" to another component, it should be understood that the certain component may be directly connected or coupled to another component or other components may also be disposed therebetween. On the other hand, when a certain component is described as being "directly connected" or "directly coupled" to another component, it should be understood that other components are not disposed therebetween. Other expressions for describing the relationship between components, such as "between" and "directly between" or "adjacent to" and "directly adjacent to" should be construed in the same manner.

The same reference numbers denote the same components throughout the specification. Terms used in the specification are for describing the exemplary embodiments and are not intended to limit the present disclosure. In the specification, the singular form also includes the plural form unless stated in the phrase. As used herein, "comprises" and/or "comprising" means that the stated component, step, operation, and/or element do not preclude the presence of addition of one or more other components, steps, operations, and/or elements.

The present disclosure relates to a method of controlling a torque of a driving system of an electric vehicle and relates to a method of generating a torque command and controlling a torque, which may generate a torque command by evading a backlash band in which backlash may occur to prevent the occurrence of the backlash in the driving system rather than a control method of alleviating a problem due to the backlash of the driving system.

In an exemplary embodiment of the present disclosure, a method of separating operating torque regions of a front-wheel motor and a rear-wheel motor is used to generate a torque command by evading a backlash band in a driving system.

In an exemplary embodiment of the present disclosure, the backlash band may be defined as a torque region in which backlash may occur in a driving system of a vehicle. Here, the driving system of the vehicle includes driving elements such as a driveshaft between a driving device and driving wheels, a reducer, a differential, an axle, etc. In addition to the driving device and driving wheels for driving the vehicle.

In an exemplary embodiment of the present disclosure, the driving system includes a front-wheel side driving system between a front-wheel driving device (front-wheel motor) and front wheels, and a rear-wheel side driving system between a rear-wheel driving device (rear-wheel motor) and rear wheels.

Furthermore, in an exemplary embodiment of the present disclosure, a torque is used as a meaning including both a torque input to the driving system by the driving system and transmitted and applied to the driving wheels and a torque input from the driving wheels to the driving system and transmitted and applied to the driving device.

Furthermore, in an exemplary embodiment of the present disclosure, the torque is used to include both a driving torque for accelerating the vehicle and a braking torque for decelerating the vehicle, and among them, the braking torque (deceleration torque) means a regenerative torque generated by a motor.

Unless specified separately as the driving torque and the braking torque in the specification, depending on a traveling situation of a vehicle, the torque may be the driving torque for accelerating the vehicle (acceleration situation) or the braking torque for decelerating the vehicle (deceleration situation).

In an exemplary embodiment of the present disclosure, the driving torque and a driving torque command include a torque value for accelerating the vehicle, which is defined as a forward and positive (+) torque value. On the other hand, the braking torque and a braking torque command include a torque value for decelerating the vehicle, which is defined as a backward and negative (−) torque value.

In the following description, when the front-wheel torque command and the rear-wheel torque command indicate negative (−) values, both the front-wheel torque command and the rear-wheel torque command indicating the negative (−) values refer to the regenerative torque command.

As described above, when the vehicle travels, the positive (+) torque, which is a forward torque, or the negative (−) torque, which is a backward torque, is applied to the driving system depending on whether the vehicle is accelerating or decelerating, and a direction of the torque input to the driving system and transmitted through the driving system may be changed depending on the traveling situation of the vehicle.

The present disclosure has been made based on a principle that problems due to backlash in the driving system of the vehicle mainly occur only in a torque region close to zero, and the torque region close to zero may be referred to as a backlash band in which the backlash problem may occur.

In an exemplary embodiment of the present disclosure, the backlash band may be set to a torque range from a lower limit threshold, which is a negative (−) value, and an upper limit threshold, which is a positive (+) value. That is, the backlash band may be set to a torque range including zero, and a backlash state may occur when an input torque applied from a motor, which is a driving device, to the driving system or from the driving wheels to the driving system enters the set backlash band.

The backlash is a tolerance which is present between teeth of two engaged gears as illustrated in FIG. 1. Between the two engaged gears, vibration or noise may be generated as gear teeth strike each other due to the backlash, and in the worst situation, the backlash may cause damage to the gear.

When a torque is continuously applied in one direction, since one of the two engaged gears continuously transmits a force to the other one in the same direction, the teeth of the two engaged gears maintain a state of being aligned and engaged forward, and in the instant case, no problem due to the tolerance occurs.

However, when the direction of the torque is changed, the teeth of the gears are reversely aligned after undergoing the backlash tolerance as the direction of the transmitted force is changed. At the instant time, after the alignment in the reverse direction is performed, the problem due to the backlash does not occur because the engagement of the gears is not released again while the force in the same direction is continuously re-transmitted.

However, at the moment when the direction of the transmitted force is changed, the problem due to the backlash occurs when the engagement between the teeth of the two gears is released and then the engagement is re-performed while undergoing the engagement tolerance.

Therefore, the core of the method for not causing the backlash problem is to eliminate or minimize the situation in which the gears are disengaged, which may be achieved by eliminating or minimizing the change in the direction of the torque command with respect to the driving device such as the motor.

To minimize the change in the direction of the torque command, the front and rear wheel drive devices, that is, the front-wheel motor and the rear-wheel motor may share the role, and to the present end, the separation of the torque operating regions of the front-wheel motor and the rear-wheel motor may be considered.

Figure 2:
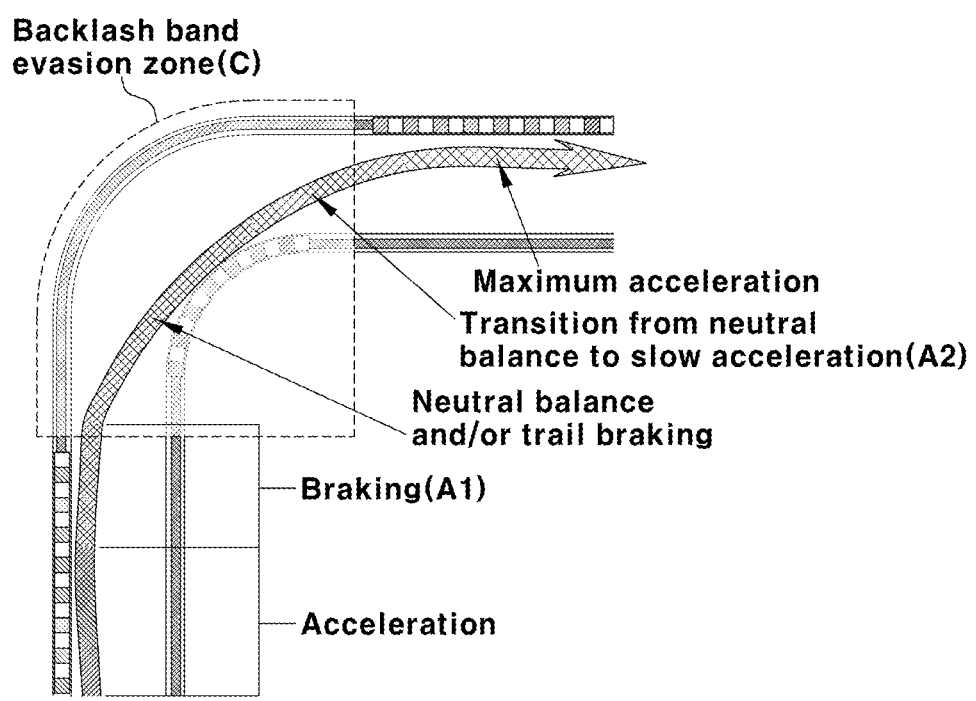
FIG. 2 is a view exemplarily illustrating a zone in which backlash band evasion control may be executed during track driving in an exemplary embodiment of the present disclosure.

FIG. 2 is a view exemplarily illustrating an acceleration/deceleration guide for an ideal track turning behavior and illustrates a zone C in which backlash band evasion control may be executed during track traveling.

A technology of inducing fun-driving on a track based on track information including track position information and track route information (including turning zone information) obtained in advance and real-time vehicle position information is already being mass-produced and applied.

In an exemplary embodiment of the present disclosure, a controller may be configured to determine whether a vehicle enters a track based on the track position information and then automatically determine whether the backlash band evasion control configured for minimizing a lap time based on the track route information including the turning zone information and the real-time vehicle position information in the track during a track mode in which the vehicle travels along the track is executed. The entry and release of the backlash band evasion mode may be autonomously selected by the present determination according to a position of the vehicle on the track route.

Referring to FIG. 2, a turning zone C in the track may be referred to as a zone in which the backlash band evasion control may be executed ("backlash band evasion zone"). The turning zone C on the track may be defined as a range from at least a part of the end portion of a braking zone marked "A1" and "Braking" to a part of a gradual acceleration zone marked "A2," and a maximum acceleration torque is not used in the turning zone C.

That is, the maximum acceleration torque is not required in an even-throttle or neutral balance zone in which precise longitudinal load movement control and responsiveness of the vehicle, such as the turning zone C on the track, is required.

Therefore, it is very effective to enable the backlash band evasion control to be executed only while the vehicle passes the turning zone C, and therefore, in an exemplary embodiment of the present disclosure, the controller may be set to automatically select the backlash band evasion mode only while the vehicle passes the turning zone C based on the track information and the real-time vehicle position information on the track.

That is, when a driving mode of the vehicle is a track mode in which the vehicle is passing the turning zone C, the controller may be configured to determine that the backlash band evasion mode has been automatically selected and then perform a control process of the responsiveness priority mode, which is the backlash band evasion mode. Of course, when the controller determines that the power priority mode (normal mode), which is the conventional torque control mode, has been selected, the control process of the power priority mode may be performed thereafter.

The present disclosure to be described below is based on the fact that a maximum power required during turning of the vehicle as in the track of FIG. 2 during performance-oriented driving does not reach a maximum power at which the driving device of the vehicle may be provided.

In general, the control strategy of generating a maximum torque is not effective because, when the maximum torque is generated unreasonably in a severe turning zone, it may lead to a serious deterioration in stability in the behavior of the vehicle.

Therefore, it is possible to allow the vehicle to determine the performance-oriented driving situation and the turning situation and actively select the power priority mode configured for generating the maximum output or select the responsiveness priority mode in which responsiveness is prioritized by evading the backlash band even when the maximum output is limited as the torque control mode of the vehicle.

In the following description, the existing torque control mode in which the maximum output may be generated is referred to as "power priority mode" or "normal mode," and the torque control mode in which the backlash band evasion control is performed to evade the backlash band is referred to as "backlash band evasion mode," "responsiveness priority mode," or "throttle balancing assist mode."

Furthermore, by performing active switching between the power priority mode and the responsiveness priority mode, a function of ultimately assisting performance-oriented driving is referred to as "active throttle balancing assist" or "active even-throttle assist function."

In an exemplary embodiment of the present disclosure, the throttle balancing assist (even throttle assist) control is performed in a state in which the vehicle enters the responsiveness priority mode. In the following description, the "throttle balancing" and "even throttle" may be understood as the same meaning.

Figure 3:
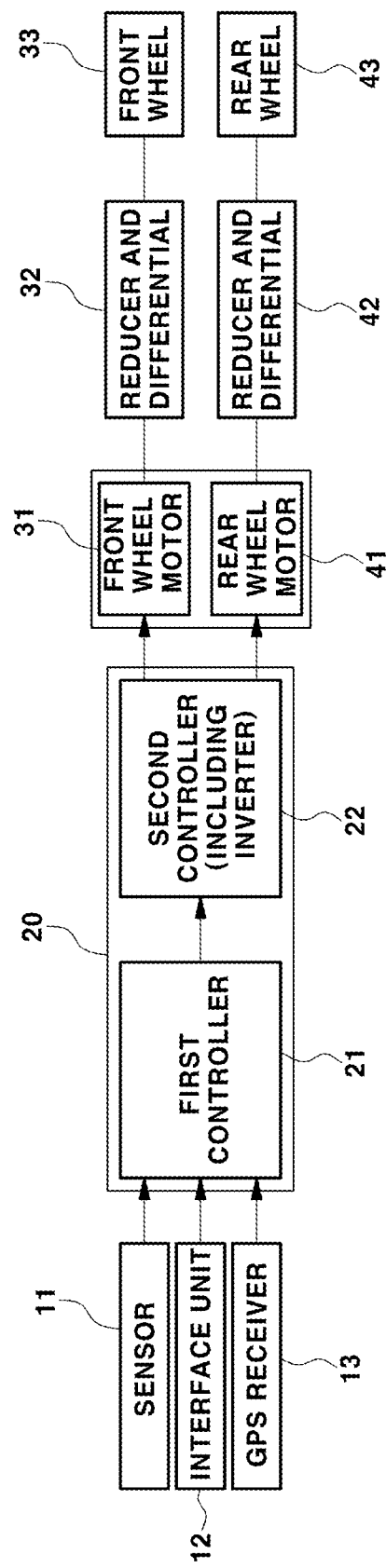
FIG. 3 is a block diagram illustrating a configuration of a device for performing a driving system torque control process according to an exemplary embodiment of the present disclosure.
Figure 4:
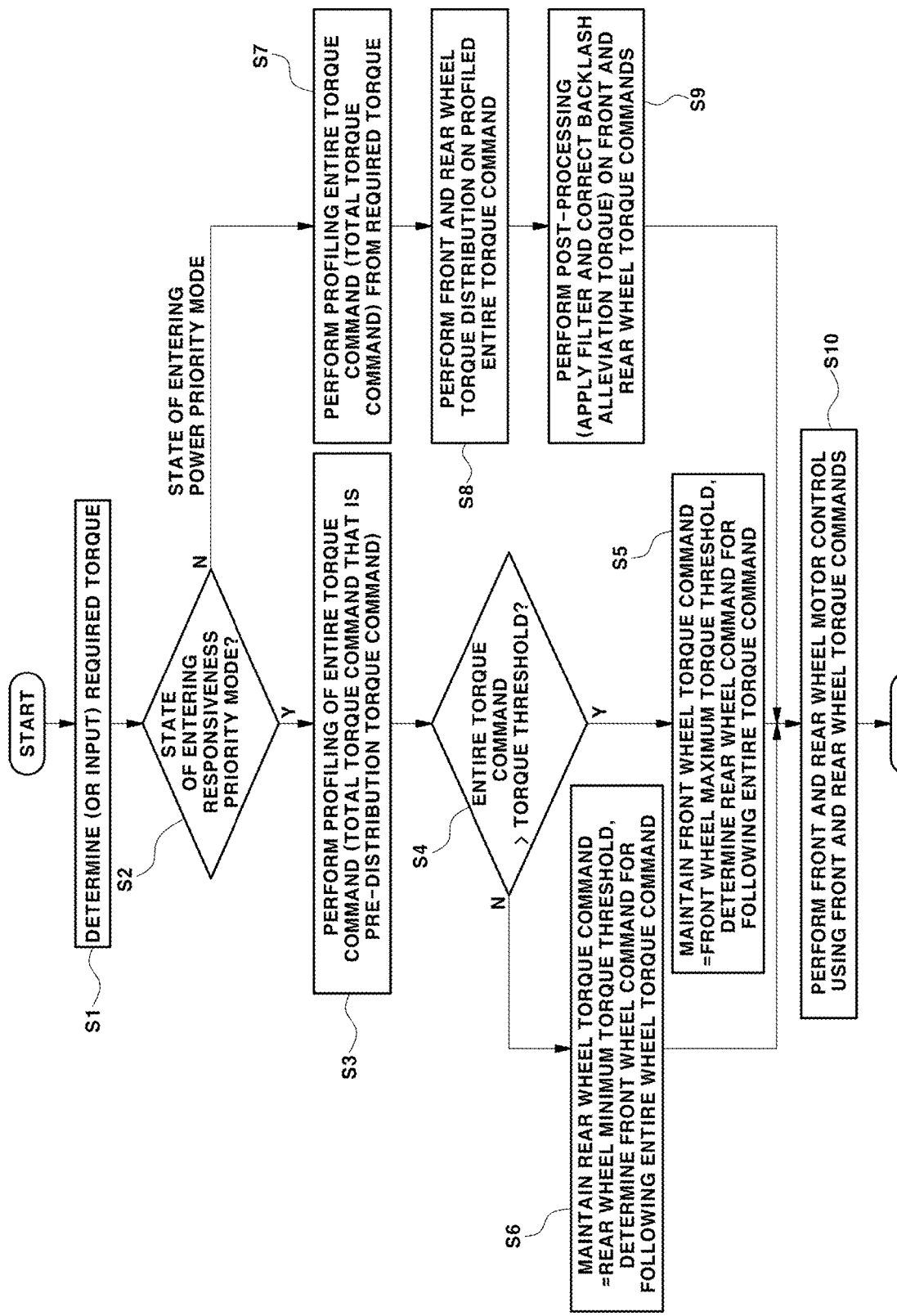
FIG. 4 is a flowchart illustrating the driving system torque control process according to the exemplary embodiment of the present disclosure.

FIG. 3 is a block diagram illustrating a configuration of a device for performing a driving system torque control process according to an exemplary embodiment of the present disclosure, and FIG. 4 is a flowchart illustrating the driving system torque control process according to the exemplary embodiment of the present disclosure.

The present disclosure may be applied to a vehicle provided with a plurality of driving devices as a driving source for driving the vehicle and applied to a vehicle in which each of a front wheel 33 and a rear wheel 43 is driven by an independent driving device. Furthermore, the present disclosure may be applied to an electric vehicle that travels using motors 31 and 41 as the driving device.

The present disclosure may be applied to a vehicle provided with a front-wheel driving device for applying a torque to the front wheel 33 and a rear-wheel driving device for applying a torque to the rear wheel 43. Here, both the front wheel 33 and the rear wheel 43 are driving wheels connected to the driving devices to transmit a power.

Furthermore, the present disclosure may be applied to a vehicle in which both the front-wheel driving device and the rear-wheel driving device are motors. In the following description, the motor 31 for driving the front wheel 33 will be referred to as "front-wheel motor," and the motor 41 for driving the rear wheel 43 will be referred to as "rear-wheel motor."

Referring to FIG. 3, the front wheel motor 31 and the rear wheel motor 41 are illustrated as driving devices of an electric vehicle. The front wheel motor 31 and the rear wheel motor 41 are respectively connected to the front wheel 33 and the rear wheel 43, which are driving wheels, through driving system elements such as reducers, differentials 32 and 42, and axles to transmit a power.

Therefore, torques output from the front wheel motor 31 and the rear wheel motor 41 may be transmitted to the front wheel 33 and the rear wheel 43 through the driving system elements such as the reducers, the differentials 32 and 42, and the axles.

Furthermore, although not separately illustrated in FIG. 3, a battery is connected to the front wheel motor 31 and the rear wheel motor 41 via an inverter to be charged and discharged. The inverter may include a front wheel inverter for driving and controlling the front wheel motor 31 and a rear wheel inverter for driving and controlling the rear wheel motor 41.

In an electric vehicle, operations (driving and regeneration) of the front wheel motor 31 and the rear wheel motor 41 are controlled according to a torque command generated by the controller 20. The controller 20 is configured to determine a required torque according to a vehicle driving state for travel of the vehicle and generates a final torque command (total torque command) based on the determined required torque.

Furthermore, the controller 20 is configured to control the operations of the front wheel motor 31 and the rear wheel motor 41 through the inverter according to the final torque command. In the following description, when the torque command is a positive (+) value, the torque command is defined as a driving torque command, and when the torque command is a negative (−) value, the torque command is defined as a regenerative torque command.

Here, the final torque command is a required torque command required for the travel of the vehicle and is a pre-distribution torque command before the torque is distributed to the front and rear wheels. In the following description, the pre-distribution torque command, the total torque command, the required torque command, and the total torque command are used as the same meaning.

In an exemplary embodiment of the present disclosure, the controller 20 may include a first controller 21 for determining the required torque based on a driving input value of a driver or receiving the required torque from another controller such as an advanced driver assistance system (ADAS) controller, and generating and outputting the final torque command (required torque command) based on the required torque, and a second controller 22 for controlling the operations of the front wheel motor 31 and the rear wheel motor 41 according to the final torque command input from the first controller 21.

The first controller 21 may be a vehicle control unit (VCU) for determining and generating a torque command for controlling an operation of a motor in a typical vehicle. Since a method and process of determining a torque command in a vehicle are well-known technical matters in the art, a detailed description thereof will be omitted.

Furthermore, the first controller 21 may be configured to determine the front wheel torque command and the rear wheel torque command from the final torque command through a front wheel and rear wheel torque distribution process. Therefore, when the final front wheel torque command and rear wheel torque command are output from the first controller 21, the second controller 22 receives the final front wheel torque command and rear wheel torque command and is configured to control the operations of the front wheel motor 31 and the rear wheel motor 41 through the front wheel inverter and the rear wheel inverter.

The second controller 22 may be a conventional motor control unit (MCU) for controlling an operation of a driving motor through an inverter according to a torque command output from a vehicle controller in an electric vehicle.

Although the above description has been made that the control subject is classified into the first controller 21 and the second controller 22, the torque control process according to an exemplary embodiment of the present disclosure may also be performed by one integrated control element instead of a plurality of controllers.

A control element integrated with the plurality of controllers may be collectively referred to as a controller, and a torque control process according to an exemplary embodiment of the present disclosure, which will be described below, may be performed by the controller.

In an exemplary embodiment of the present disclosure, vehicle driving information such as a driver's driving input value input to the controller 20 is information indicating the vehicle driving state and may include sensor detection information detected by the sensor 11 and input to the controller via a vehicle network.

In the instant case, the sensor 11 for detecting the vehicle driving information may include an accelerator position sensor (APS) for detecting an accelerator position input value (APS value, %) of a driver, a brake pedal position sensor (BPS) for detecting a brake pedal position input value (BPS value, %) of the driver, a sensor configured for detecting a driving system speed, and a sensor configured for detecting a vehicle speed.

Here, the speed of the driving system may be rotating speeds of the front wheel motor 31 and the rear wheel motor 41, which are the driving motors, or rotating speeds (wheel speeds) of the driving wheels 33 and 43. In the instant case, the sensor configured for detecting the speed of the driving system may be a sensor configured for detecting the rotation speed of each of the motors 31 and 41, which may be a general resolver for detecting a position of a rotor of the motor. Alternatively, the sensor configured for detecting the speed of the driving system may be a typical wheel speed sensor configured for detecting the rotating speeds (wheel speeds) of the driving wheels 33 and 43.

Furthermore, the sensor configured for detecting the vehicle speed may also be the wheel speed sensor. Because obtaining the vehicle speed information from the signal from the wheel speed sensor is a well-known technique in the art, a detailed description thereof will be omitted.

As the vehicle driving information detected by the sensor 11 and for determining and generating the required torque and the torque command from the controller 20, the APS value (%) of the driver, the BPS value (%) of the driver, the rotating speeds of the motors 31 and 41, the rotating speeds of the driving wheels 33 and 43, the vehicle speed, or the like may be selectively used.

In the vehicle driving information, the APS value and the BPS value, which are the pedal input values of the driver, may be considered as the driving input information of the driver, and the rotating speeds of the motors 31 and 41, the rotating speeds of the driving wheels 33 and 43, and the vehicle speed detected by the sensor 11 may be considered as the vehicle state information.

Furthermore, the vehicle driving information may also include information determined by the controller 20 itself in a broad sense and furthermore, may also include information (e.g., the required torque information) input to the controller 20 from another controller (e.g., a controller of the ADAS) in the vehicle via the vehicle network.

In FIG. 2, reference numeral "12" denotes an interface unit connected to the controller 20 in the vehicle, and the interface unit 12 may include an input device and an output device. In an exemplary embodiment of the present disclosure, the interface unit 12 may be provided to enable a driver's manipulation, input, and selection, display of various information, etc and used to perform an ON/OFF operation of the responsiveness priority mode (backlash band evasion mode), provide various user interfaces (UI), etc.

In an exemplary embodiment of the present disclosure, an input device and an output device of the interface unit 12 may be used by being selected from known devices as long as they may perform the ON/OFF operation of the responsiveness priority mode, the input, selection, or display of various information, etc.

For example, the interface unit 12 may include an operating device such as a button or switch provided in a vehicle, an input device or display device of an audio, video, navigation (ANV) system, a touch screen, etc.

In FIG. 2, reference numeral "13" denotes a Global Positioning System (GPS) receiver mounted on the vehicle and connected to the controller 20, and the Global Positioning System (GPS) receiver 13 is provided to receive a GPS signal indicating a current position of the vehicle from the outside of the vehicle.

The GPS receiver 13 is provided to input the received GPS signal to the controller 20. Therefore, the controller 20 may be configured to determine and decide the current position of the vehicle in real time from the GPS signal received and input through the GPS receiver 13.

Meanwhile, the present disclosure provides a method of generating a torque command by evading the backlash band in which the backlash of the driving system may occur, and here, the evasion of the backlash band is to maximally prevent a situation in which the torque command enters the backlash band.

This may be achieved through a method of maintaining the front wheel torque (which means an actual torque) and the front wheel torque command as only the negative (−) torque values and the rear wheel torque (which means an actual torque) and the rear wheel torque command as only the positive (+) torque values. As described above, the backlash issue is because there are the characteristics that occur when the direction of the torque is changed.

This strategy is the most necessary condition for throttle balancing (even throttle) in a turning zone during track traveling. Therefore, the backlash band evasion strategy may be representatively applied to a throttle balancing (even throttle) assist situation.

When the control strategy is applied, the gear is continuously aligned in the positive (+) torque transmission direction in order not to enter the backlash band in the rear wheel side driving system, which may be achieved by continuously generating at least a small amount of positive (+) directional torque.

In the instant case, the small amount of positive (+) directional torque for continuously aligning the gear in the positive (+) torque transmission direction may be defined as a rear wheel minimum torque threshold (positive value), and a value (positive value) of the rear wheel torque command during backlash band evasion control may be determined in a region which is greater than or equal to a preset rear wheel minimum torque threshold.

Likewise, the gear is continuously aligned in the negative (−) torque transmission direction in order not to enter the backlash band in the front wheel side driving system, which may be achieved by continuously generating at least a small amount of negative (−) directional torque.

In the instant case, the small amount of negative (−) directional torque for continuously aligning the gear in the negative (−) torque transmission direction may be defined as a front wheel maximum torque threshold (negative value), and a value (negative value) of the front wheel torque command during backlash band evasion control may be determined in a region which is smaller than or equal to a preset front wheel maximum torque threshold.

In an exemplary embodiment of the present disclosure, the rear wheel minimum torque threshold may be set to a torque value outside the backlash band, which is a torque region in which the backlash may occur in the rear wheel side driving system, in the controller 20. That is, the rear wheel minimum torque threshold may be set to a value which is greater than the upper limit threshold of the backlash band of the rear wheel side driving system.

Likewise, the front wheel maximum torque threshold may be set to a torque value outside the backlash band, which is a torque region in which the backlash may occur in the front wheel side driving system, in the controller 20. In the instant case, the front wheel maximum torque threshold in the controller 20 may be set to a value which is smaller than the lower limit threshold of the backlash band of the front wheel side driving system.

However, a problem which may occur in the present method is that since only the motor of one of the front wheel side and the rear wheel side is used for acceleration and regenerative braking (deceleration), a maximum generation output may be insufficient compared to when the motors of both sides are used for all purposes.

That is, since only one of the front wheel motor 31 and the rear wheel motor 41 is used, the maximum generation output may be insufficient compared to when both the front wheel motor 31 and the rear wheel motor 41 are used for acceleration or used for regenerative braking. This may make it difficult to achieve maximum acceleration performance or maximum regenerative braking.

However, considering a principle in which during acceleration, the load movement is concentrated on the rear wheel side and thus the torque at the rear wheel side plays the main role, and conversely, during deceleration, the load movement is concentrated on the front wheel side and thus the regenerative torque at the front wheel side plays the main role, the backlash band evasion strategy suggested by the present disclosure does not result in a very large performance degradation.

Nevertheless, because it is certain that the use of only the motor of one side does not reach the maximum performance which may be achieved when the motors of both sides are used together, the following countermeasures may be considered to overcome these limitations.

First, the responsiveness priority mode may be set in the controller 20, and the responsiveness priority mode may be selectively performed. The responsiveness priority mode may be referred to as a backlash band evasion mode in which the backlash band evasion control is performed.

The on or off of the responsiveness priority mode (backlash band evasion mode) may be selected by a driver manipulating the interface unit 12. That is, the driver may turn on or off the responsiveness priority mode using the interface unit 12 connected to the controller 20.

FIG. 5A is a view exemplarily illustrating a control state in a power priority mode (normal mode) in which a responsiveness priority mode is released in the exemplary embodiment of the present disclosure, and FIG. 5B is a view exemplarily illustrating a control state in a responsiveness priority mode (backlash band evasion mode) in the exemplary embodiment of the present disclosure.

FIG. 5A and FIG. 5B illustrate a method of determining front and rear wheel torque distribution states and front and rear wheel torque commands by the controller 20 during control of the power priority mode (normal mode) and during control of the responsiveness priority mode (backlash band evasion mode) when the APS value is detected through the sensor 11.

In an exemplary embodiment of the present disclosure, when the driver turns off the responsiveness priority mode through the interface unit 12, even when a predetermined entry condition for the vehicle driving information is satisfied, the controller 20 may be prevented from entering the responsiveness priority mode, and at the instant time, a state of the power priority mode (normal mode) may be maintained in the state in which the responsiveness priority mode has been released, and the control of the power priority mode may be continuously performed.

On the other hand, when the driver turns on the responsiveness priority mode through the interface unit 12 and the predetermined entry condition is satisfied, the controller 20 may enter the responsiveness priority mode, and at the instant time, the control of the responsiveness priority mode may be performed in the state in which the power priority mode has been released.

In an exemplary embodiment of the present disclosure, the responsiveness priority mode is a mode in which the even throttle (throttle balancing) assist function is performed, and in the state in which the controller 20 has entered the responsiveness priority mode, the backlash band evasion control of limiting the front wheel torque command to the front wheel maximum torque threshold or less or limiting the rear wheel torque command to the rear wheel minimum torque threshold or more is performed by the controller 20.

In the responsiveness priority mode, which is the backlash band evasion mode, the front wheel motor 31 and the rear wheel motor 41 do not generate driving forces in the same direction or regenerative braking forces in the same direction, and since the front wheel motor 31 performs only regeneration and the rear wheel motor 41 performs only driving, it is impossible to perform the driving and regeneration of the vehicle with the maximum output.

Instead, in the state of entering the responsiveness priority mode, unlike the power priority mode (normal mode), which is the conventional torque control mode, because the front wheel torque command or the rear wheel torque command does not require the zero-crossing of a torque that passes zero torque in the backlash band, it is possible to secure responsiveness.

Furthermore, in an exemplary embodiment of the present disclosure, the power priority mode (normal mode) performed when the responsiveness priority mode is released has no difference compared to the conventional torque control mode. Since the front wheel motor 31 and the rear wheel motor 41 perform driving and regeneration in cooperation with each other upon entry of the power priority mode, it is possible to perform the driving and regeneration of the vehicle with the maximum output.

However, in a state in which the power priority mode is entered after the response priority mode is released, the zero-crossing of the torque is unavoidable, and thus the responsiveness is inevitably delayed.

Describing the driving system torque control process according to the exemplary embodiment of the present disclosure with reference to FIG. 4, the controller 20 receives the vehicle driving information detected by the sensor 11, and as in the case of the general driving system torque control, determines the required torque based on the vehicle driving information by itself or receives the required torque from another controller (operation S1 in FIG. 4).

Furthermore, when the power priority mode is entered and selected in operation S2 in FIG. 4, the controller 20 is configured to perform profiling of the entire torque command in the power priority mode (normal mode) based on the required torque (operation S7 in FIG. 4).

In an exemplary embodiment of the present disclosure, the profiling of the entire torque command (the total torque command, the pre-distribution torque command, and the required torque command) and the determination of the final entire torque command based on the required torque may be understood as the same meaning.

Hereinafter, in the description of the present disclosure, the total torque command means the entire torque command, which is the pre-distribution torque command, and means the torque command (command including the summed torque value) obtained by summing the front wheel torque command and the rear wheel torque command. In an exemplary embodiment of the present disclosure, the torque command for each wheel or the torque command for each axle indicates the front wheel torque command and the rear wheel torque command.

Furthermore, in the description of the present disclosure, the invasion or entry into the backlash band means when the torque value of the corresponding torque command becomes a torque value within the backlash band, and the passing of the backlash band means a case in which the torque value of the torque command invades the backlash band from the outside of the backlash band, then continuously increases or decreases, and thus is out of the backlash band again.

The power priority mode (normal mode) is a mode in which the front wheel torque command and the rear wheel torque command are determined and operated in all torque regions of the positive (+) value and the negative (−) value according to the entire torque command (total torque command), which is the pre-distribution torque command, to satisfy the required torque with the torques applied by the front wheel motor and the rear wheel motor.

For example, in the power priority mode (normal mode), both the front wheel torque command and the rear wheel torque command may be determined as the negative (−) torque values in a situation in which there is no accelerator position input by the driver, that is, a vehicle deceleration situation in which the driver does not step on an accelerator pedal.

Thereafter, when the driver steps on the accelerator pedal to accelerate the vehicle, both the front wheel torque command and the rear wheel torque command are switched from the negative (−) torque values to the positive (+) torque values in the power priority mode. In the power priority mode, it is inevitable that both the front wheel torque command and the rear wheel torque command pass the backlash band when the direction of the torque is changed.

At the present time, the sum of the front wheel torque command and the rear wheel torque command needs to follow the entire torque command, and the front wheel torque command and the rear wheel torque command may be determined by the typical front and rear wheel torque distribution process of distributing the entire torque command according to a front and rear wheel distribution ratio (operation S8 in FIG. 4).

As described above, while the torque passes the backlash band, even when the driver steps on the accelerator pedal, the direction of the torque applied from the motor to the driving system is not rapidly changed to minimize the backlash problem.

That is, as may be seen in FIG. 5A, the front wheel torque command and the rear wheel torque command are not switched from the negative (−) torques to the positive (+) torques immediately when the driver steps on the accelerator pedal in the power priority mode, and the front wheel torque command and the rear wheel torque command are determined so that the direction of the torque may be changed while the torque applied to the driving system by the motor for a predetermined time period after the driver presses the accelerator pedal passes the backlash band.

For the time for which the torque passes the backlash band as described above, torque slope control of limiting a slope (change rate) between the front wheel torque command and the rear wheel torque command is performed not to rapidly increase the torque command. In the power priority mode, the backlash control is performed so that the torque is smoothly changed within the backlash band with respect to both the front wheel torque command and the rear wheel torque command.

To the present end, the controller 20 may set a maximum allowable change rate in the backlash band with respect to the front wheel torque command and the rear wheel torque command to a small value that does not cause a backlash impact.

Therefore, while the front wheel torque command and the rear wheel torque command increase and thus the torque passes the backlash band, the controller 20 is configured to determine the front wheel torque command and the rear wheel torque command to be a value that smoothly varies depending on the maximum allowable change rate of the small value.

Furthermore, the front wheel torque command and the rear wheel torque command after the torque passes the backlash band are determined to be magnitudes at which the driving torque required for acceleration may be satisfied through a general front and rear wheel torque distribution process.

As described above, in the power priority mode, in the case of becoming an acceleration situation by the driver pressing the accelerator pedal, both the front wheel torque command and the rear wheel torque command are switched from the negative (−) torque values to the positive (+) torque values, and when the direction of the torque is changed, both the front wheel torque command and the rear wheel torque command pass the backlash band.

In the power priority mode, since the backlash control of limiting the slope to the maximum allowable change rate with respect to both the front wheel torque command and the rear wheel torque command to minimize the problem caused by the backlash, the acceleration delay of the vehicle in the backlash band is inevitable.

Furthermore, conversely, when the driver tips out the accelerator pedal in a state of pressing the accelerator pedal, both the front wheel torque command and the rear wheel torque command in the power priority mode are changed from the positive (+) torque values to the negative (−) torque values. As described above, even when the direction of the torque is reversely changed, it is inevitable that both the front wheel torque command and the rear wheel torque command pass the backlash band.

Even when the regenerative torque is required for coasting deceleration traveling after the tip-out of the accelerator pedal, the direction of the torque applied from the motor to the driving system is not rapidly changed to minimize the backlash problem while the torque passes the backlash band.

That is, as may be seen in FIG. 5A, the front wheel torque command and the rear wheel torque command are not switched from the positive (+) torques to the negative (−) torques immediately when the driver tips out the accelerator pedal in the power priority mode, and the front wheel torque command and the rear wheel torque command are determined so that the direction of the torque may be changed while the torque applied to the driving system by the motor for a predetermined time period after tip-out of the accelerator pedal.

For the time for which the torque passes the backlash band as described above, the torque slope control of limiting the slope (change rate) between the front wheel torque command and the rear wheel torque command is performed not to rapidly decrease the torque command.

The backlash control is performed so that the torque is smoothly changed within the backlash band with respect to both the front wheel torque command and the rear wheel torque command, and at the instant time, the controller 20 is configured to determine the front wheel torque command and the rear wheel torque command to be a value that smoothly varies depending on the maximum allowable change rate of the small value.

Furthermore, the controller 20 is configured to perform the general front and rear wheel torque distribution to satisfy the regenerative torque required for coasting deceleration traveling after the torque passes the backlash band, and determines the front wheel torque command and the rear wheel torque command configured for satisfying the regenerative torque command (pre-distribution torque command) which is the entire torque command during coasting deceleration traveling.

As described above, in the power priority mode, in the case of becoming a coasting deceleration situation by the driver tipping out the accelerator pedal, both the front wheel torque command and the rear wheel torque command are switched from the positive (+) torque values to the negative (−) torque values, and when the direction of the torque is changed, both the front wheel torque command and the rear wheel torque command pass the backlash band. Therefore, when the accelerator pedal tips-out, the occurrence of a deceleration delay is inevitable.

In the power priority mode, when the front wheel torque command and the rear wheel torque command are determined through the front and rear wheel torque distribution, post-processing may be performed on the determined front and rear wheel torque commands, and at the instant time, it is possible to determine the final front wheel torque command and rear wheel torque command by applying a filter to the commands and performing a backlash alleviation torque correction (operation S9 in FIG. 4).

Subsequently, when the final front wheel torque command and the rear wheel torque command are determined, the controller 20 is configured to control the front wheel motor 31 and the rear wheel motor 41 according to the determined final front wheel torque command and rear wheel torque command.

Next, describing the torque control in the state of selecting and entering the responsiveness priority mode (backlash band evasion mode), in the case of currently entering the responsiveness priority mode in operation S2 in FIG. 4, the controller 20 is configured to perform the entire torque command profiling that is configured to determine the entire torque command based on the required torque for the backlash band evasion control (operation S3 in FIG. 4).

In the state of entering the responsiveness priority mode, the direction of the torque output by each of the front wheel motor 31 and the rear wheel motor 41 and transmitted through the driving system in the entire range of the required torque regardless of the acceleration and deceleration situations of the vehicle is controlled to always maintain the same direction without fluctuation.

At the present time, the front wheel torque command is always determined to be the negative (−) torque value, and the rear wheel torque command is always determined to be the positive (+) torque value, and therefore, in the state of entering the responsiveness priority mode, the front wheel motor 31 continuously applies the negative (−) torque to the driving system and the rear wheel motor 41 continuously applies the positive (+) torque to the driving system during travel of the vehicle.

As described above, in the responsiveness priority mode, when the front wheel torque command is determined to be the negative (−) torque value and the rear wheel torque command is determined to be the positive (+) torque value, the controller 20 is configured to determine the torque command summing the front wheel torque command and the rear wheel torque command to be the torque value following the entire torque command finally determined based on the required torque.

In a deceleration zone in which the vehicle is decelerating because the driver does not press the accelerator pedal, the entire torque command finally determined from the required torque includes the negative (−) torque value as the regenerative torque command.

In the responsiveness priority mode, even in the deceleration zone in which the vehicle is decelerating, the rear wheel torque command is determined to be a value greater than or equal to the rear wheel minimum torque threshold set to the positive (+) torque value, and at the instant time, the front wheel torque command is determined to be a value (negative value) obtained by subtracting the determined rear wheel torque (positive torque) from the entire torque command (negative torque).

Referring to FIG. 4, when the entire torque command in operation S3 is compared with the rear wheel minimum torque threshold and the entire torque command is smaller than or equal to the rear wheel minimum torque threshold in operation S4, in operation S6, the controller 20 is configured to determine the rear wheel torque command to be the rear wheel minimum torque threshold and is configured to determine the remaining torque obtained by subtracting the rear wheel minimum torque threshold from the entire torque command to follow the entire torque command.

The front wheel torque command determined as described above includes the negative (−) torque value. Therefore, the rear wheel motor 41 outputs and applies the positive (+) torque to the driving system, and the front wheel motor 31 outputs and applies the negative (−) torque to the driving system.

Accordingly, when the driver steps on the accelerator pedal, the front wheel torque command may be determined to be the front wheel maximum torque threshold set to the negative (−) torque value immediately when the driver steps on the accelerator pedal, and at the instant time, the rear wheel torque command is determined to be the positive (+) torque value obtained by subtracting the determined front wheel torque command (negative torque) from the entire torque command (positive torque) corresponding to the accelerator position input value.

Furthermore, when the entire torque command in operation S3 is compared with the front wheel maximum torque threshold and the entire torque command is greater than or equal to the front wheel maximum torque threshold in operation S4, in operation S5, the controller 20 is configured to determine the front wheel torque command to be the front wheel maximum torque threshold and is configured to determine the remaining torque obtained by subtracting the front wheel maximum torque threshold from the entire torque command to follow the entire torque command.

As a result, while the driver is stepping on the accelerator pedal, the front wheel motor 31 may output the negative (−) torque corresponding to the front wheel maximum torque threshold, and the rear wheel motor 41 may output the positive (+) torque obtained by subtracting the front wheel motor command (negative torque) from the entire torque command (positive torque).

Accordingly, when there is a tip-out in which the driver takes a foot off the accelerator pedal, the rear wheel torque command may be re-determined to be the rear wheel minimum torque threshold, and the front wheel torque command is determined to be the negative (−) torque value obtained by subtracting the rear wheel torque command (positive torque) from the entire torque command (negative torque) which is the regenerative torque.

As described above, even in the responsiveness priority mode (backlash band evasion mode), the determination of the front wheel torque command and the rear wheel torque command to satisfy the entire torque command is similar to that in the power priority mode (normal mode).

When the front wheel torque command and the rear wheel torque command are determined in operation S5 or operation S6 in FIG. 4, the controller 20 is configured to control the operations of the front wheel motor 31 and the rear wheel motor 41 according to the front wheel torque command and the rear wheel torque command (operation S10).

As described above, in the state of selecting and entering the responsiveness priority mode, the backlash band evasion control in which both the front wheel torque and the rear wheel torque do not pass the backlash band which is a torque range in which backlash may occur is executed.

As a result, in the responsiveness priority mode, the directions of the front wheel torque and the rear wheel torque are not reversely changed during the travel of the vehicle, and consequently, a problem due to the backlash does not occur. Furthermore, as illustrated in FIG. 5B, since the vehicle may be accelerated immediately when the driver steps on the accelerator pedal, it is possible to improve the acceleration/deceleration responsiveness of the vehicle.

Meanwhile, the method of controlling the driving system torque according to an exemplary embodiment of the present disclosure includes a method of limiting the slope of the front wheel torque command and the rear wheel torque command during mode transition using a slope limit value determined according to a vehicle driving state. Here, the vehicle driving state may include a front wheel torque command of a previous time step and a rear wheel torque command of the previous time step.

Due to various reasons, the continuous execution of the backlash band evasion control is inevitably limited. This is because a zone in which the throttle balancing assist is required during track traveling is a turning zone, and the throttle balancing assist control is required only until the turning state ends.

When the turning state ends, a situation in which the maximum torque is required may occur, and the backlash band evasion control and the throttle balancing assist control need to be ended before the end of the turning state due to the characteristics of the backlash band evasion control incapable of generating the maximum torque.

This means that the backlash band evasion and throttle balancing assist functions need to be continuously turned on or off repeatedly according to situations, and this means that the mode transition between the responsiveness priority mode (backlash band evasion mode) in which backlash band evasion control and throttle balancing assist control are performed and the power priority mode (normal mode) and is essential.

However, a sudden torque change may occur during the above-described mode transition, and the sudden torque change leads to a change in a front and rear wheel torque distribution ratio, and thus the vehicle behavior may become unstable, and a longitudinal impact and jerk of the vehicle may occur. Therefore, a method of limiting the torque slope required when the torque control mode is transitioned is required.

Furthermore, even in each mode, a possibility of an impact occurring due to a physical limit of a torque change or an inertia of the driving system needs to be considered at the same time. Furthermore, because the torque in the driving system needs to pass through the backlash band during mode transition, the resulting backlash impact also needs to be considered.

Factors to be considered to perform the slope limit during mode transition may include a slope limit value considering zero-crossing of a front wheel torque, a slope limit value considering zero-crossing of a rear wheel torque, a slope limit value based on a mode transition progress rate of the front wheel torque, a slope limit value based on a mode transition progress rate of the rear wheel torque, a slope limit value for following a required torque direction during the mode transition of the front wheel torque, and a slope limit value for following the required torque direction during the mode transition of the rear wheel torque.

In an exemplary embodiment of the present disclosure, the slope limit value may be defined as a maximum changeable amount allowed per time step, which is a control period. Furthermore, in the following description, "mode transition" means a transition between the responsiveness priority mode (backlash band evasion mode and throttle balancing assist mode) and the power priority mode (normal mode).

Furthermore, the meaning of the "zero-crossing" includes that the front wheel torque command, which is a negative (−) torque value, is changed to a positive (+) torque value by passing through the backlash band after becoming greater than the front wheel maximum torque threshold, or that the rear wheel torque command, which is a positive (+) torque value, is changed to a negative (−) torque value by passing through the backlash band after becoming smaller than the rear wheel maximum torque threshold. When the zero-crossing occurs, the torque command passes a zero torque in the backlash band.

Hereinafter, a method of performing slope control of a torque (command value) during mode transition will be described in detail. In an exemplary embodiment of the present disclosure, one of the slope control methods to be described below may be applied for the slope control of the front wheel torque command or the rear wheel torque command during mode transition.

Slope Control Considering Zero-Crossing of Front Wheel Torque

A case in which the front wheel torque and the front wheel torque command need to perform the zero-crossing is representatively a case in which, when the transition proceeds from the responsiveness priority mode for throttle balancing to the power priority mode, which is the existing torque control mode, by the driver requiring a greater driving torque through driving manipulation such as accelerator pedal manipulation, the front wheel torque needs to assist the driving torque beyond a minimum regenerative torque maintenance state (front wheel maximum torque threshold maintenance state).

Furthermore, even in the transition state from the power priority mode to the responsiveness priority mode, the originally distributed front wheel torque command needs to be changed to a regenerative torque maintenance value (front wheel maximum torque threshold) for throttle balancing and backlash band evasion, and thus even in the instant case, the zero-crossing of the front wheel torque command occurs.

During the zero-crossing of the front wheel torque command, the controller 20 may limit the slope of the front wheel torque command to the slope limit value determined by a map. In the instant case, as the map, a map using a value obtained by feeding back the front wheel torque command of the previous time step (previous control period) as an input and a slope limit value as an output may be used. That is, the slope limit value of the front wheel torque command is determined by the map as a value corresponding to the front wheel torque command of the previous time step.

Because the map includes the purpose of preventing a backlash impact caused by a sudden change during the zero-crossing of the torque, in the map, the closer an input value is to zero (i.e., the smaller the input value is based on an absolute value), the slope limit value (based on the absolute value) may be set to a smaller value, and the farther the input value is from zero (i.e., the greater the input value is based on the absolute value), the slope limit value (based on the absolute value) may be set to a greater value.

Slope Control Considering Zero-Crossing of Rear Wheel Torque

A case in which the rear wheel torque and the rear wheel torque command need to perform the zero-crossing is representatively a case in which, when the transition proceeds from the responsiveness priority mode for throttle balancing to the power priority mode, which is the normal mode, by the driver requiring a greater regenerative torque, the rear wheel torque needs to assist the regenerative torque beyond a minimum driving torque maintenance state (rear wheel minimum torque threshold maintenance state).

Furthermore, even in the transition state from the power priority mode to the responsiveness priority mode, the originally distributed rear wheel torque command (regenerative torque command) needs to be changed to a driving torque maintenance value (rear wheel minimum torque threshold) for throttle balancing and backlash band evasion, and thus even in the instant case, the zero-crossing of the rear wheel torque command occurs.

During the zero-crossing of the rear wheel torque command, the controller 20 may limit the slope of the rear wheel torque command to the slope limit value determined by the map. In the instant case, as the map, a map using a value obtained by feeding back the rear wheel torque command of the previous time step as an input and a slope limit value as an output may be used. That is, the slope limit value of the rear wheel torque command is determined by the map as a value corresponding to the rear wheel torque command of the previous time step.

Because the map includes the purpose of preventing the backlash impact caused by the sudden change during the zero-crossing of the torque, in the map, the closer an input value is to zero (i.e., the smaller the input value is based on the absolute value), the slope limit value (based on the absolute value) may be set to a smaller value, and the farther the input value is from zero (i.e., the greater the input value is based on the absolute value), the slope limit value (based on the absolute value) may be set to the greater value.

Slope Control for Mode Transition Torque Blending of Front Wheel Torque

During a torque change between the responsiveness priority mode and the power priority mode, even when the front wheel torque command (negative value) is maintained as the front wheel maximum torque threshold value (negative value) or less, an impact may occur due to the inertia or stiffness characteristics of the driving system.

Therefore, it is important to prevent the occurrence of a discontinuity in the slope of the torque command when the mode transition proceeds by performing torque blending in a state (transient state) in which there is a transition between the front wheel torque command before the mode transition and the front wheel torque command after the mode transition.

To the present end, the controller 20 may be configured to determine a mode transition progress rate (%) indicating how far the last front wheel torque command has been changed between two torque command values before and after the mode transition after comparing the last front wheel torque command on which the slope is limited during the mode transition with the front wheel torque command before the mode transition and the front wheel torque command after the mode transition, and determine the slope limit value for mode transition using a map using the determined mode transition progress rate as an input.

Here, "the last front wheel torque command with slope limit performed" means the front wheel torque command fed back after the slope control and limit in the previous time step (previous control period) are performed.

In an exemplary embodiment of the present disclosure, the front wheel torque command before and after the mode transition may be determined by the controller 20 based on the vehicle driving information. For example, when the mode before the transition is the responsiveness priority mode, the front wheel torque command before the mode transition may be the front wheel maximum torque threshold.

In the instant case, when the mode after the transition is the power priority mode, the front wheel torque command after the mode transition may be the front wheel torque command in the power priority mode (normal mode) determined based on the current vehicle driving information, which is the front wheel torque command in the existing torque control mode obtained by distributing the entire torque command according to the front and rear wheel distribution ratio.

That is, in the power priority mode, after determining the entire torque command based on the current vehicle driving information, a typical front and rear wheel torque distribution process of distributing the determined entire torque command into the front wheel torque command and the rear wheel torque command according to the front and rear wheel distribution ratio, and the front wheel torque command determined from the entire torque command through the typical front and rear wheel torque distribution process may be the front wheel torque command after the mode transition.

Furthermore, in an exemplary embodiment of the present disclosure, the mode transition progress rate related to the front wheel torque command may be determined as a value of 0 to 100%. For example, when the front wheel torque command with the slope limit performed is fed back in the previous time step and the fed-back front wheel torque command value of the previous time step is the same as the front wheel torque command value before the mode transition, the mode transition progress rate of the front wheel torque command is defined as 0%.

When the fed back front wheel torque command of the previous time step is the same value as the front wheel torque command after the mode transition, the mode transition progress rate of the front wheel torque command is defined as 100%, and the mode transition progress rate (%) of the front wheel torque command may be determined as a value between 0% and 100% according to a relative position of the fed-back front wheel torque command value between two command values (start value and target value) before and after the mode transition.

In summary, the mode transition progress rate (%) expresses which position the torque command value of the previous time step fed back after the slope limit is performed is present between the torque command value before the mode transition and the torque command value after the mode transition as a percentage (%), which may be determined as a percentage (%) value of the fed-back torque command value of the previous time step to a difference value between the torque command before the mode transition and the torque command after the mode transition.

Furthermore, setting data defining a correlation between the mode transition progress rate (%) and the slope limit value may be stored in advance and used in the controller 20, and a slope limit value corresponding to the current mode transition progress rate (%) may be determined by the setting data.

In the exemplary embodiment of the present disclosure, the setting data for determining the slope limit value from the mode transition progress rate (%) may be a map including the mode transition progress rate (%) as an input and the slope limit value corresponding to the mode transition progress rate (%) as an output.

In general, when the torque command varies between an arbitrary start value and an arbitrary target value, to prevent the occurrence of the discontinuity in the slope of the varying torque command, as the torque command is closer to the start value and the target value, the change in the torque command needs to be smaller.

Therefore, in the setting data, the closer the torque command (fed-back front wheel torque command value) is to the start value (front wheel torque command value before the mode transition) and the target value (front wheel torque command value after the mode transition), that is, as the mode transition progress rate (%) is closer to 0% and 100% based on a preset set value positioned between 0% and 100%, the slope limit value may be set to a smaller value.

Furthermore, in the setting data, the slope limit value may be set to a greater value as the mode transition progress rate (%) is closer to the setting value based on 0% and 100%. Here, the setting value between 0% and 100% may be, for example, 50%, which is a center value between 0% and 100%. of course, this is exemplary, and the setting value may be a value other than 50% of values between 0% and 100%.

As described above, it is possible to determine and use the mode transition progress rate (%) in real time to determine the slope limit value, but instead of using the mode transition progress rate, it is possible to use a difference value between the front wheel torque command before the mode transition and the fed-back front wheel torque command of the previous time step or use a difference value between the front wheel torque command after the mode transition and the fed-back front wheel torque command of the previous time step. In the instant case, the difference values may be absolute values.

That is, as the setting data, instead of using the map using the mode transition progress rate (%) of the front wheel torque command as an input, it is possible to use a map using the absolute value of the difference value between the front wheel torque command before the mode transition and the fed-back front wheel torque command as an input and using the slope limit value as an output.

Alternatively, as the setting data, it is possible to use a map using an absolute value of the difference value between the front wheel torque command after the mode transition and the fed-back front wheel torque command as an input and using the slope limit value as an output.

Even in the present map, the slope limit value may be set to a smaller value as the input value is smaller (i.e., closer to zero).

Slope Control for Mode Transition Torque Blending of Rear Wheel Torque

Similar to the front wheel torque command, even when the rear wheel torque command (positive value) maintains the rear wheel minimum torque threshold (positive value) or more when the torque between the responsiveness priority mode and the power priority mode is changed, an impact may occur due to the inertia or stiffness characteristics of the driving system.

Therefore, it is important to prevent the occurrence of the discontinuity in the slope of the torque command when the mode transition proceeds by performing torque blending in a state (transient state) in which there is a transition between the rear wheel torque command before the mode transition and the rear wheel torque command after the mode transition.

To the present end, the controller 20 may be configured to determine a mode transition progress rate (%) indicating how far the last rear wheel torque command has been changed between two torque command values before and after the mode transition after comparing the last rear wheel torque command on which the slope is limited during the mode transition with the rear wheel torque command before the mode transition and the rear wheel torque command after the mode transition, and determine the slope limit value for mode transition using a map using the determined mode transition progress rate as an input.

Here, "the last rear wheel torque command with slope limit performed" means the rear wheel torque command fed back after the slope control and limit in the previous time step are performed.

In an exemplary embodiment of the present disclosure, the rear wheel torque command before and after the mode transition may be determined by the controller 20 based on the vehicle driving information. For example, when the mode before the transition is the responsiveness priority mode, the rear wheel torque command before the mode transition may be the rear wheel minimum torque threshold.

In the instant case, when the mode after the transition is the power priority mode, the rear wheel torque command after the mode transition may be the rear wheel torque command in the power priority mode (normal mode) determined based on the current vehicle driving information, which is the rear wheel torque command in the existing torque control mode obtained by distributing the entire torque command according to the rear and rear wheel distribution ratio.

That is, in the power priority mode, after determining the entire torque command based on the current vehicle driving information, a typical front and rear wheel torque distribution process of distributing the determined entire torque command into the front wheel torque command and the rear wheel torque command according to the front and rear wheel distribution ratio, and the rear wheel torque command determined from the entire torque command through the typical front and rear wheel torque distribution process may be the rear wheel torque command after the mode transition.

Furthermore, the mode transition progress rate related to the rear wheel torque command may be determined as a value of 0 to 100%. For example, when the rear wheel torque command with the slope limit performed is fed back in the previous time step and the fed-back rear wheel torque command value of the previous time step is the same as the rear wheel torque command value before the mode transition, the mode transition progress rate of the rear wheel torque command is defined as 0%.

When the fed back rear wheel torque command of the previous time step is the same value as the rear wheel torque command after the mode transition, the mode transition progress rate of the rear wheel torque command is defined as 100%, and the mode transition progress rate (%) of the rear wheel torque command may be determined as a value between 0% and 100% according to a relative position of the fed-back rear wheel torque command value between two command values (start value and target value) before and after the mode transition.

In summary, the mode transition progress rate (%) expresses which position the torque command value of the previous time step fed back after the slope limit is performed is present between the torque command value before the mode transition and the torque command value after the mode transition as a percentage (%), which may be determined as a percentage (%) value of the fed-back torque command value of the previous time step to a difference value between the torque command before the mode transition and the torque command after the mode transition.

Furthermore, setting data defining a correlation between the mode transition progress rate (%) and the slope limit value may be stored in advance and used in the controller 20, and a slope limit value corresponding to the current mode transition progress rate (%) may be determined by the setting data.

In the exemplary embodiment of the present disclosure, the setting data for determining the slope limit value from the mode transition progress rate (%) may be a map including the mode transition progress rate (%) as an input and the slope limit value corresponding to the mode transition progress rate (%) as an output.

In general, when the torque command varies between an arbitrary start value and an arbitrary target value, to prevent the occurrence of the discontinuity in the slope of the varying torque command, as the torque command is closer to the start value and the target value, the change in the torque command needs to be smaller.

Therefore, in the setting data, the closer the torque command (fed-back rear wheel torque command value) is to the start value (rear wheel torque command value before the mode transition) and the target value (rear wheel torque command value after the mode transition), that is, as the mode transition progress rate (%) is closer to 0% and 100% based on a preset set value positioned between 0% and 100%, the slope limit value may be set to a smaller value.

Furthermore, in the setting data, the slope limit value may be set to a greater value as the mode transition progress rate (%) is closer to the setting value based on 0% and 100%. Here, the setting value between 0% and 100% may be, for example, 50%, which is a center value between 0% and 100%. of course, this is exemplary, and the setting value may be a value other than 50% of values between 0% and 100%.

As described above, it is possible to determine and use the mode transition progress rate (%) in real time to determine the slope limit value, but instead of using the mode transition progress rate, it is possible to use a difference value between the rear wheel torque command before the mode transition and the fed-back rear wheel torque command of the previous time step or use a difference value between the rear wheel torque command after the mode transition and the fed-back rear wheel torque command of the previous time step. In the instant case, the difference values may be absolute values.

That is, as the setting data, instead of using the map using the mode transition progress rate (%) of the rear wheel torque command as an input, it is possible to use a map using the absolute value of the difference value between the rear wheel torque command before the mode transition and using the fed-back rear wheel torque command as an input and using the slope limit value as an output.

Alternatively, as the setting data, it is possible to use a map using an absolute value of the difference value between the rear wheel torque command after the mode transition and the fed-back rear wheel torque command as an input and using the slope limit value as an output.

Even in the present map, the slope limit value may be set to a smaller value as the input value is smaller (i.e., closer to zero).

Slope Limit for Following Required Torque Direction During Mode Transition of Front Wheel Torque An unnecessary torque change needs to be prevented to prevent the occurrence of a problem in which stability is degraded due to a sudden change in power distribution between the front and rear wheels during mode transition.

Therefore, a direction of a value obtained by subtracting the sum of the front wheel torque command and the rear wheel torque command of the previous time step fed back from the driver's required torque determined based on the driving input value (pedal input value) of the driver does not match with a direction of a change in the front wheel torque command during the mode transition, the slope of the change in the front wheel torque command needs to be limited.

To the present end, a map using [driver's required torque—(the sum of the fed-back front wheel torque command and rear wheel torque command)] as an input and using the slope limit value as an output may be used to determine the slope limit value of the front wheel torque command.

Here, the map is setting data in which the slope limit value of the front wheel torque command corresponding to a value of [driver's required torque—(the sum of the fed-back front wheel torque command and rear wheel torque command)] is set, and is input and stored in the controller 20 in advance and then used to determine the slope limit value of the front wheel torque command from the driver's required torque and the fed-back front wheel torque command and rear wheel torque command during the mode transition when the vehicle travels.

In the instant case, the driver's required torque means a required torque according to the driver's driving input, that is, a required torque determined according to the pedal input value (the APS value or the BPS value), which may be the above-described entire torque command (required torque command).

Furthermore, in relation to the direction, when the subtracted value, that is, the value of [driver's required torque—(the sum of the fed-back front wheel torque command and rear wheel torque command)] is a positive (+) value, a direction of the subtracted value is a positive (+) direction, and when the subtracted value is a negative (−) value, the direction of the subtracted value may be defined as a negative (−) direction.

When the subtracted value is the positive (+) direction, it means a situation in which the torque command needs to increase further to follow the driver's required torque, and when the subtracted value is the negative (−) direction, it means a situation in which the torque command needs to decrease further to follow the driver's required torque.

Furthermore, the direction of the change in the front wheel torque command during the mode transition may be defined as a change in the positive (+) direction (change in the increase direction) when the front wheel torque command value increases compared to the previous time step and defined as a change in the negative (−) direction (change in the decrease direction) when the front wheel torque command value decreases compared to the previous time step.

In the map, which is the setting data for determining the slope limit value, when the input value is a positive (+) value, the torque command needs to further increase to follow the driver's required torque, and thus as the input value is greater, an increase slope (positive slope) limit value of the front wheel torque command may be set to a greater value, and a decrease slope (negative slope) limit value of the front wheel torque command may be set to a smaller value based on the absolute value. Therefore, a slope limit function is provided so that an increase is easy but a decrease is difficult.

Conversely, when the input value is a negative (−) value, as the input value (negative value) is smaller, the increase slope (positive slope) limit value of the front wheel torque command may be set to a smaller value, and the decrease slope (negative slope) limit value of the front wheel torque command may be set to a greater value based on the absolute value.

Slope Limit for Following Required Torque Direction During Mode Transition of Rear Wheel Torque Even in the rear wheel torque, similar to the front wheel torque, a direction (negative or positive direction) of a difference between the driver's required torque value during the mode transition and the sum of the fed-back front wheel torque command and rear wheel torque command does not match with a direction (negative direction, which is a decrease direction or positive direction, which is an increase direction) of a change in the rear wheel torque command during the mode transition, a slope of the above change is limited.

To the present end, a map using [driver's required torque—(the sum of the fed-back front wheel torque command and rear wheel torque command)] as an input and using the slope limit value as an output may be used to determine the slope limit value of the rear wheel torque command.

Here, the map is setting data in which the slope limit value of the rear wheel torque command corresponding to a value of [driver's required torque—(the sum of the fed-back front wheel torque command and rear wheel torque command)] is set, and is input and stored in the controller 20 in advance and then used to determine the slope limit value of the rear wheel torque command from the driver's required torque and the fed-back front wheel torque command and rear wheel torque command during the mode transition when the vehicle travels.

The direction of the change in the rear wheel torque command during the mode transition may be defined as a change in the positive (+) direction (change in the increase direction) when the rear wheel torque command value increases compared to the previous time step and defined as a change in the negative (−) direction (change in the decrease direction) when the rear wheel torque command value decreases compared to the previous time step.

In the map, which is the setting data for determining the slope limit value, when the input value is a positive (+) value, the torque command needs to further increase to follow the driver's required torque, and thus as the input value is greater, an increase slope (positive slope) limit value of the rear wheel torque command may be set to a greater value, and a decrease slope (negative slope) limit value of the rear wheel torque command may be set to a smaller value based on the absolute value. Therefore, a slope limit function is provided so that an increase is easy but a decrease is difficult.

Conversely, when the input value is a negative (−) value, as the input value (negative value) is smaller, the increase slope (positive slope) limit value of the rear wheel torque command may be set to a smaller value, and the decrease slope (negative slope) limit value of the rear wheel torque command may be set to a greater value based on the absolute value.

Figure 6:
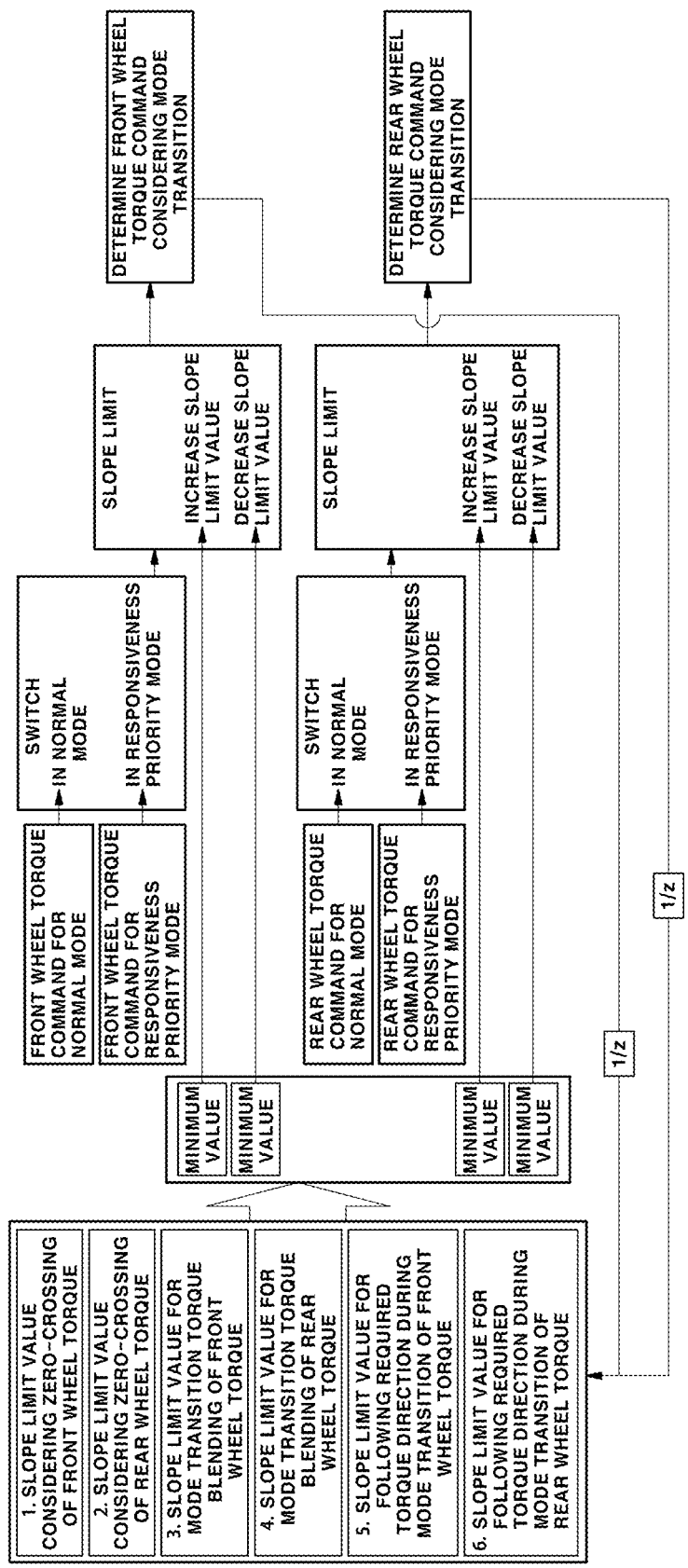
FIG. 6 is a view for illustrating a method of determining a slope limit value in a method of controlling a driving system torque according to the exemplary embodiment of the present disclosure.

A total of six methods of determining the slope limit value of the torque command during the mode transition have been described above in an exemplary embodiment of the present disclosure, and FIG. 6 is a view for describing a method of determining the slope limit value in the method of controlling the driving system torque according to the exemplary embodiment of the present disclosure.

In an exemplary embodiment of the present disclosure, the slope limit value determined by at least one of the six methods may be applied by being determined as a final slope limit value, or a minimum value among the slope limit values determined by at least two or more of the six methods may be applied by being determined as the final slope limit value.

FIG. 6 illustrates that all of the six methods are used, and the minimum value among the slope limit values determined by the six methods is applied by being determined as the final slope limit value.

This is assumed that both the slope limit value in the increase direction ("increase slope limit value") and the slope limit value in the decrease direction ("decrease slope limit value") are defined as positive (+) values, and the slope limit value in the decrease direction is determined to be the minimum value using the absolute value.

By applying the present method, the same slope limit value may always be applied to both the front wheel torque command and the rear wheel torque command at the same time, and thus the synchronized front wheel torque command and rear wheel torque command may guide the sum of two values to follow the driver's required torque value in a steady state.

When the driver's required torque value varies, the above method may not be effective. Therefore, instead of using the minimum value of the six methods, the minimum value between selective factors may be used as the slope limit value for generating each of the front wheel torque command and the rear wheel torque command.

As an exemplary embodiment of the present disclosure, as the slope limit value of the front wheel torque command, the minimum value among the slope limit values determined by the methods 1, 3 and 5 may be used, and as the slope limit value of the rear wheel torque command, the minimum value among the slope limit values determined by the methods 2, 4 and 6 may be used.

That is, the minimum value among the three methods for determining the slope limit value of the front wheel torque command is finally determined as the slope limit value of the front wheel torque command, and the minimum value among the three methods for determining the slope limit value of the rear wheel torque command is finally determined as the slope limit value of the rear wheel torque command.

Hereinafter, an example in which the slope limit is performed during the mode transition will be described with reference to the drawings.

Figure 7:
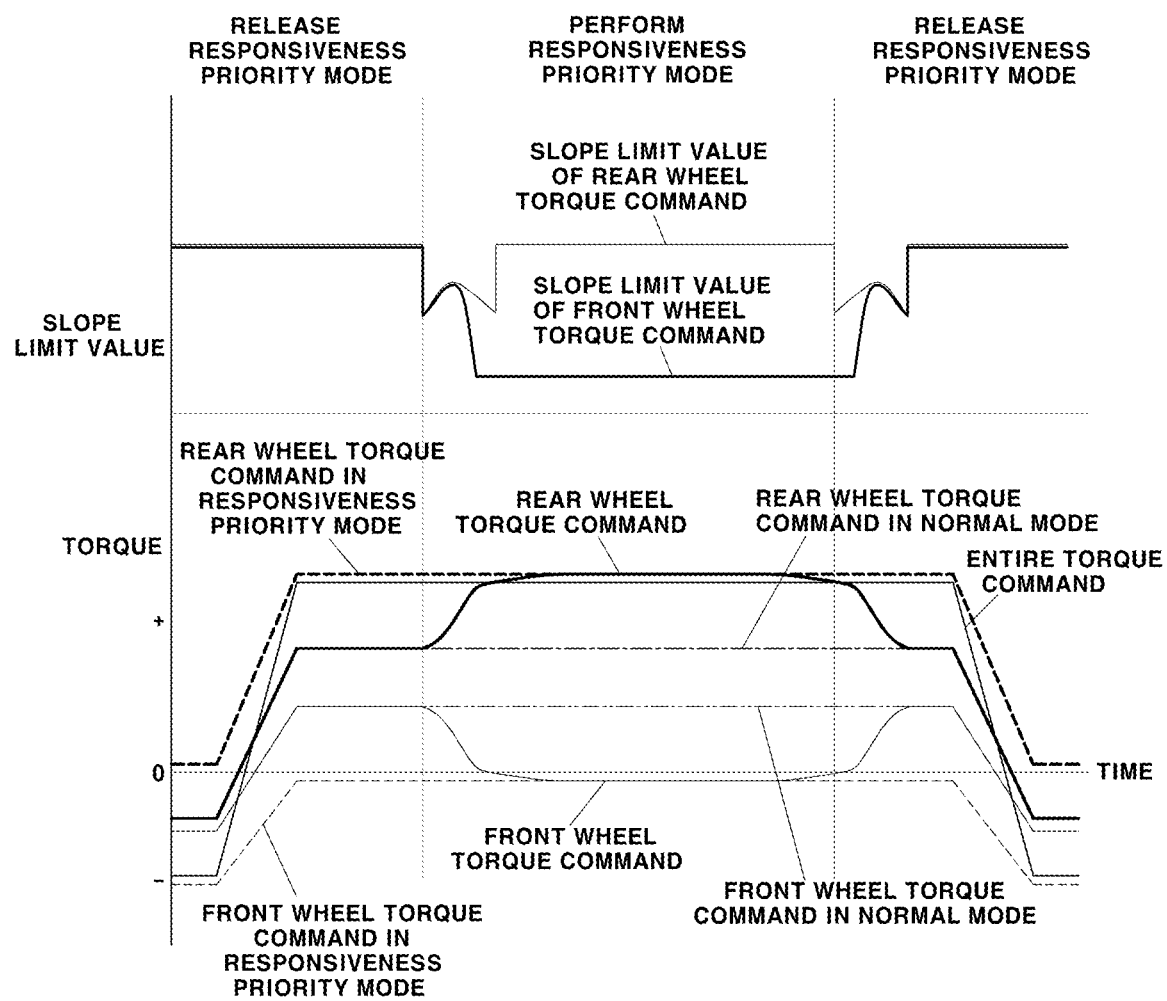
FIG. 7, FIG. 8 and FIG. 9 are views illustrating a torque command during mode transition between the responsiveness priority mode and the power priority mode in an exemplary embodiment of the present disclosure.
Figure 8:
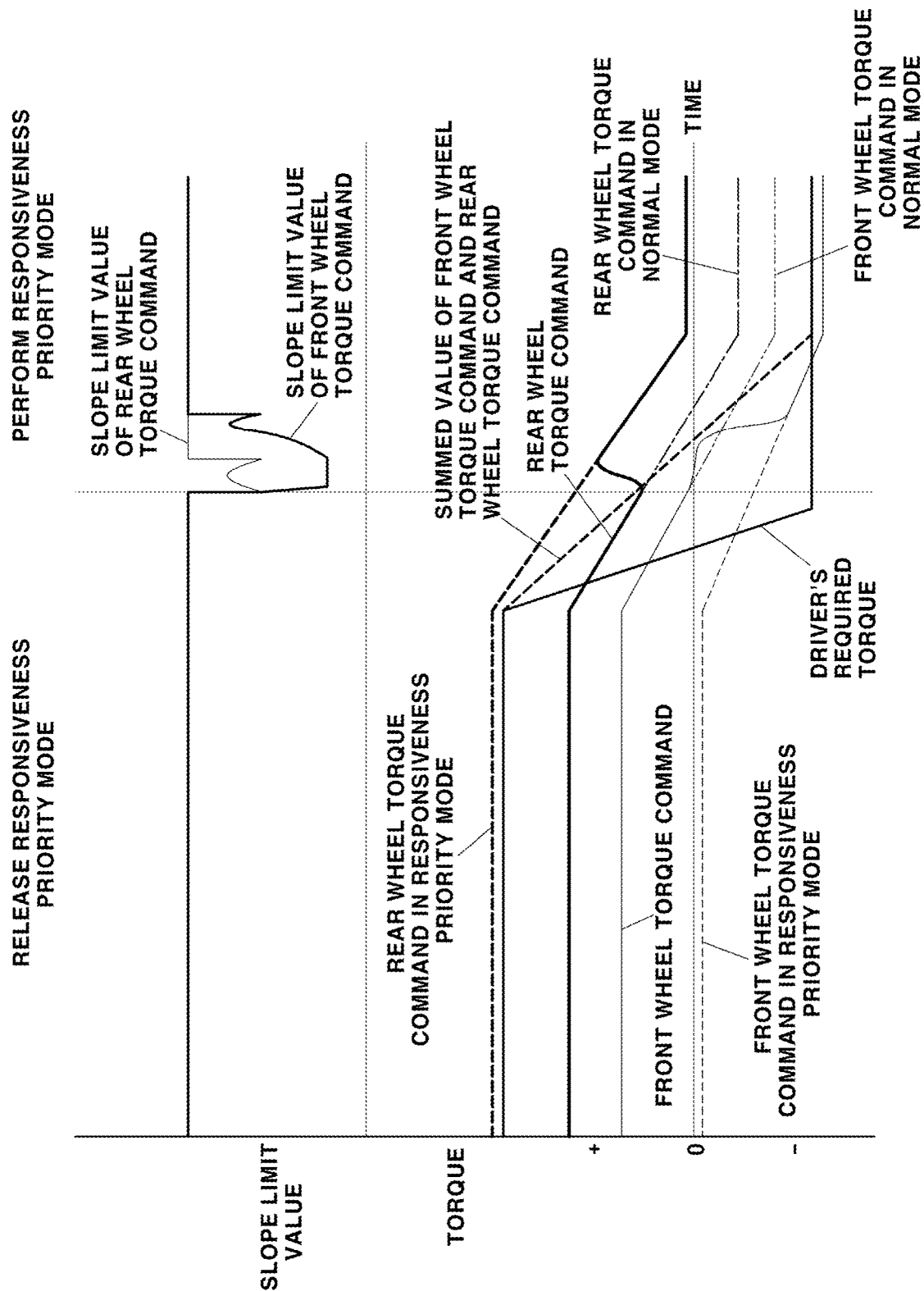
Figure 9:
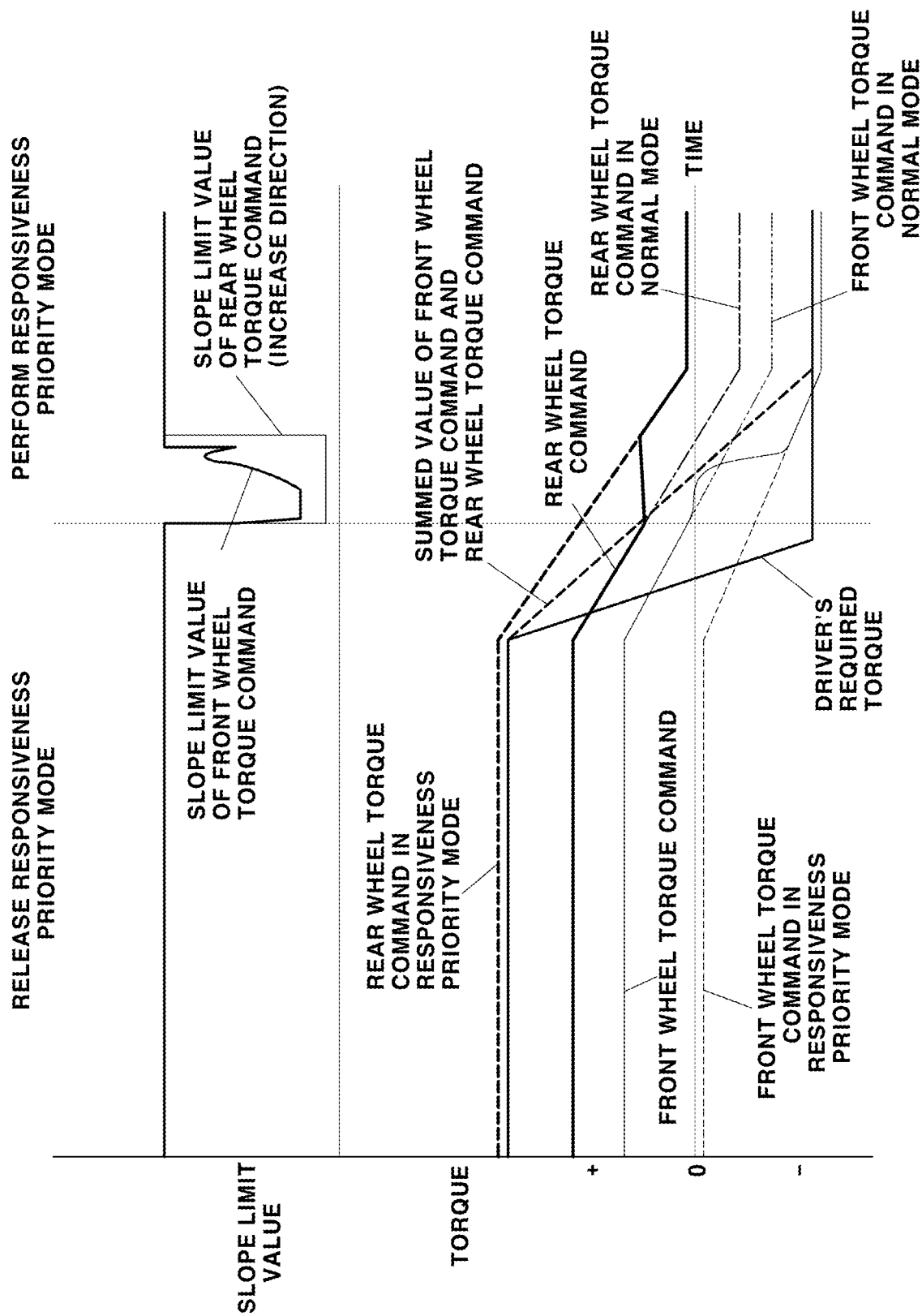

FIG. 7, FIG. 8 and FIG. 9 are views exemplarily illustrating torque commands during the mode transition between the responsiveness priority mode (throttle balancing assist mode) and the power priority mode (normal mode), which is the existing torque control mode. In each drawing, a release state of the responsiveness priority mode is a state in which the power priority mode is performed.

First, FIG. 7 illustrates the front wheel torque command and the rear wheel torque command when the mode transition re-released after entering and performing the responsiveness priority mode in the release of the responsiveness priority mode is performed, and illustrates a comparison between the front wheel torque command and the rear wheel torque command and the power priority mode (normal mode), which is the existing torque control mode, in the state of entering and performing the responsiveness priority mode.

As illustrated, as the torque command, one of the torque command for the responsiveness priority mode and the torque command for the normal mode (power priority mode) is selectively used depending on whether the responsiveness priority mode is released and performed.

However, there is a difference between the torque command for the responsiveness priority mode and the torque command for the normal mode, and a sudden change in the torque command during the mode transition is not preferable.

Therefore, a torque change occurs according to the slope limit value during the mode transition, and at the instant time, the slope limit value is determined based on the fed-back front wheel torque command and rear wheel torque command, and FIG. 7 illustrates a case in which the minimum value among the slope limit values determined by the above-described plurality of methods is used.

In the example of FIG. 7, the slope limit value of the front wheel torque command is determined to be smaller than the slope limit value of the rear wheel torque command, and this is because the fed-back front wheel torque command is in a zero-crossing situation passing through the backlash band and thus the slope limit value is more harsh than that of the rear wheel torque command which is not in the zero-crossing situation.

The slope limit value of the rear wheel torque command side also decreases compared to the release state of the responsiveness priority mode, and this is because the slope limit value determined based on the mode transition progress rate by the map rather than the reason of the zero-crossing is applied.

In the example of FIG. 7, the slope limit value is determined and applied only during the mode transition, but may be applied by the same method even when there is no transition situation.

Next, FIG. 7 illustrates slope limit values and application examples of the front wheel torque command and the rear wheel torque command in a mode transition process of entering the responsiveness priority mode from the release state of the responsiveness priority mode.

In FIG. 8, "driver's required torque" is a torque (command) value determined according to the driver's driving input and may be referred to as the entire torque command determined according to the driver's pedal input value, and "summed torque command value" is a value summing the front wheel torque command and the rear wheel torque command in the normal mode (same in FIG. 9).

FIG. 8 illustrates an example in which the above-described slope limit for following the required torque direction is not applied, that is, an example in which only the remaining methods excluding the slope limit method for following the required torque direction among the six methods are applied.

During a transition to the responsiveness priority mode from a state in which the responsiveness priority mode (throttle balancing assist mode) is released, that is, a state in which the transition is performed from the normal mode (power priority mode) to the responsiveness priority mode, it may be seen that the rear wheel torque command changes in the increase direction for a while and then converges to the torque command for responsiveness priority mode. Such a sudden change in torque distribution adversely affect vehicle stability.

On the other hand, FIG. 9 illustrates an example of the slope limit values and application examples of the front wheel torque command and the rear wheel torque command in a mode transition process of entering the responsiveness priority mode from the release state of the responsiveness priority mode, and illustrates an example in which the slope limit for following the required torque direction is applied.

It may be seen that during the transition to the responsiveness priority mode from the release of the responsiveness priority mode, an increase is suppressed even though the rear wheel torque command needs to originally increase, preventing a problem of the sudden change in torque distribution.

This is because the slope limit value in the increase direction is determined as a very small value upon determining the slope limit value of the torque command to maintain the direction of the torque change for converging to the driver's required torque because the driver's required torque (command) is smaller than the summed value of the front wheel torque command and the rear wheel torque command.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B".

Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a driving system torque of a vehicle, the method comprising:
   limiting, by a controller, a slope of a front wheel torque command for front wheel torque control and a slope of a rear wheel torque command for rear wheel torque control by a slope limit value determined according to a vehicle driving state in a mode transition process in which a torque control mode upon travel of the vehicle is switched from one mode selected among a responsiveness priority mode and a power priority mode to another mode among the responsiveness priority mode and the power priority mode,
   wherein the responsiveness priority mode is a mode in which the front wheel torque control and the rear wheel torque control are performed by the controller using the front wheel torque command and the rear wheel torque command for evading a backlash band, which is a torque region in which backlash of a driving system in the vehicle is generated, and
   wherein the power priority mode is a mode in which the front wheel torque control and the rear wheel torque control are performed by the controller using the front wheel torque command and the rear wheel torque command distributing an entire torque command required for travel of the vehicle according to a front and rear wheel distribution ratio.

2. The method of claim 1, wherein, in the responsiveness priority mode, by the controller, the front wheel torque command for the front wheel torque control is determined to be a value which is smaller than or equal to a front wheel maximum torque threshold set to a negative (−) torque value, and
   the rear wheel torque command for the rear wheel torque control is determined to be a value which is greater than or equal to a rear wheel minimum torque threshold set to a positive (+) torque value.

3. The method of claim 2, wherein the front wheel maximum torque threshold is set to a value which is smaller than a lower limit threshold in the backlash band, which is the torque region in which the backlash occurs in a front wheel side driving system, and
   the rear wheel minimum torque threshold is set to a value which is greater than an upper limit threshold in the backlash band, which is the torque region in which the backlash occurs in a rear wheel side driving system.

4. The method of claim 2, wherein, in the responsiveness priority mode, the controller is configured to:
   compare the entire torque command with the rear wheel minimum torque threshold and when the entire torque command is smaller than or equal to the rear wheel minimum torque threshold, determine that the rear wheel torque command is the rear wheel minimum torque threshold and determine that the front wheel torque command is a value obtained by subtracting the determined rear wheel torque command from the entire torque command; and
   compare the entire torque command with the front wheel minimum torque threshold and when the entire torque command is greater than or equal to the front wheel maximum torque threshold, determine that the front wheel torque command is the front wheel maximum torque threshold and determine that the rear wheel torque command is a value obtained by subtracting the determined front wheel torque command from the entire torque command.

5. The method of claim 2, wherein in the responsiveness priority mode, the front wheel torque command and the rear wheel torque command are determined so that a value obtained by summing the front wheel torque command and the rear wheel torque command follows the entire torque command.

6. The method of claim 1, wherein the limiting of the slope of the front wheel torque command and the slope of the rear wheel torque command by the slope limit value includes determining that the slope limit value of the front wheel torque command is a value corresponding to a front wheel torque command of a previous time step when zero-crossing in which the front wheel torque command passes a zero torque in the backlash band is performed in the mode transition process.

7. The method of claim 6, wherein as the front wheel torque command is a smaller value based on an absolute value, the slope limit value of the front wheel torque command is determined to be a smaller value.

8. The method of claim 1, wherein the limiting of the slope of the front wheel torque command and the slope of the rear wheel torque command by the slope limit value includes determining that the slope limit value of the rear wheel torque command is a value corresponding to a rear wheel torque command of a previous time step when zero-crossing in which the rear wheel torque command passes a zero torque in the backlash band is performed in the mode transition process.

9. The method of claim 8, wherein as the rear wheel torque command is a smaller value based on an absolute value, the slope limit value of the rear wheel torque command is determined to be a smaller value.

10. The method of claim 1, wherein the limiting of the slope of the front wheel torque command and the slope of the rear wheel torque command by the slope limit value includes:
    determining a mode transition progress rate by comparing a front wheel torque command of a previous time step with a front wheel torque command before mode transition and a front wheel torque command after the mode transition in the mode transition process; and determining that the slope limit value of the front wheel torque command is a value corresponding to the determined mode transition progress rate.

11. The method of claim 10, wherein the mode transition progress rate is determined to be a percentage (%) value of the front wheel torque command value of the previous time step to a difference value between the front wheel torque command before the mode transition and the front wheel torque command after the mode transition, and the slope limit value of the front wheel torque command is determined to be a greatest value among set values of the mode transition progress rate in a range of 0% and 100%, and determined to be a smaller value as the mode transition progress rate is a value closer to 0% and 100%.

12. The method of claim 1, wherein the limiting of the slope of the front wheel torque command and the slope of the rear wheel torque command by the slope limit value includes:

determining that the slope limit value of the front wheel torque command is a value corresponding to a difference value between a front wheel torque command of a previous time step and a front wheel torque command before the mode transition in the mode transition process; or determining that the slope limit value of the front wheel torque command is a value corresponding to a difference value between the front wheel torque command of the previous time step and a front wheel torque command after the mode transition in the mode transition process.

13. The method of claim 1, wherein the limiting of the slope of the front wheel torque command and the slope of the rear wheel torque command by the slope limit value includes:

determining a mode transition progress rate by comparing a rear wheel torque command of a previous time step with a rear wheel torque command before mode transition and a rear wheel torque command after the mode transition in the mode transition process; and determining that the slope limit value of the rear wheel torque command is a value corresponding to the determined mode transition progress rate.

14. The method of claim 13, wherein the mode transition progress rate is determined to be a percentage (%) value of the rear wheel torque command value of the previous time step to a difference value between the rear wheel torque command before the mode transition and the rear wheel torque command after the mode transition, and the slope limit value of the rear wheel torque command is determined to be a greatest value among set values of the mode transition progress rate in a range of 0% and 100%, and determined to be a smaller value as the mode transition progress rate is a value closer to 0% and 100%.

15. The method of claim 1, wherein the limiting of the slope of the front wheel torque command and the slope of the rear wheel torque command by the slope limit value includes:

determining that the slope limit value of the rear wheel torque command is a value corresponding to a difference value between a rear wheel torque command of a previous time step and a rear wheel torque command before the mode transition in the mode transition process; or determining that the slope limit value of the rear wheel torque command is a value corresponding to a difference value between the rear wheel torque command of the previous time step and a rear wheel torque command after the mode transition in the mode transition process.

16. The method of claim 1, wherein the limiting of the slope of the front wheel torque command and the slope of the rear wheel torque command by the slope limit value includes determining that the slope limit value of the front wheel torque command is a value corresponding to [driver's required torque-(summed value of front wheel torque command and rear wheel torque command)] in the mode transition process, and the summed value of the front wheel torque command and the rear wheel torque command is a value summing a front wheel torque command of a previous time step and a rear wheel torque command of the previous time step.

17. The method of claim 16, wherein the slope limit value of the front wheel torque command is determined by a map using the [driver's required torque-(summed value of front wheel torque command and rear wheel torque command)] as an input to the map, and in the map,
when the [driver's required torque-(summed value of front wheel torque command and rear wheel torque command)], which is an input value, is a positive (+) value, as the input value is a greater value, an increase slope limit value of the front wheel torque command is set to a greater value, and a decrease slope limit value of the front wheel torque command is set to a smaller value based on an absolute value, and when the input value is a negative (−) value, as the input value is smaller, the increase slope limit value of the front wheel torque command is set to a smaller value, and the decrease slope limit value of the front wheel torque command is set to a greater value based on the absolute value.

18. The method of claim 1, wherein the limiting of the slope of the front wheel torque command and the slope of the rear wheel torque command by the slope limit value includes determining that the slope limit value of the rear wheel torque command is a value corresponding to the [driver's required torque-(summed value of front wheel torque command and rear wheel torque command)] in the mode transition process, and the summed value of the front wheel torque command and the rear wheel torque command is a value summing a front wheel torque command of a previous time step and a rear wheel torque command of the previous time step.

19. The method of claim 18, wherein the slope limit value of the rear wheel torque command is determined by a map using the [driver's required torque-(summed value of front wheel torque command and rear wheel torque command)] as an input to the map, and in the map,
when the [driver's required torque-(summed value of front wheel torque command and rear wheel torque command)], which is an input value, is a positive (+) value, as the input value is a greater value, an increase slope limit value of the rear wheel torque command is set to a greater value, and a decrease slope limit value of the rear wheel torque command is set to a smaller value based on an absolute value, and when the input value is a negative (−) value, as the input value is smaller, the increase slope limit value of the rear wheel torque command is set to a smaller value, and the decrease slope limit value of the rear wheel torque command is set to a greater value based on the absolute value.

20. The method of claim 1, wherein the limiting of the slope of the front wheel torque command and the slope of the rear wheel torque command by the slope limit value includes:
 a) determining that the slope limit value of the front wheel torque command is a value corresponding to a front wheel torque command of a previous time step;
 b) determining that the slope limit value of the rear wheel torque command is a value corresponding to a rear wheel torque command of the previous time step;
 c) determining a mode transition progress rate by comparing the front wheel torque command of the previous time step with a front wheel torque command before mode transition and a front wheel torque command after the mode transition and determining that the slope limit value of the front wheel torque command is a value corresponding to the determined mode transition progress rate;
 d) determining a mode transition progress rate by comparing the rear wheel torque command of the previous time step with a rear wheel torque command before mode transition and a rear wheel torque command after the mode transition and determining that the slope limit value of the rear wheel torque command is a value corresponding to the determined mode transition progress rate;
 e) determining that the slope limit value of the front wheel torque command is a value corresponding to [driver's required torque-(summed value of front wheel torque command and rear wheel torque command)];
 f) determining that the slope limit value of the rear wheel torque command is a value corresponding to the [driver's required torque-(summed value of front wheel torque command and rear wheel torque command)]; and
 g) determining a minimum value among the slope limit values determined in operations a), b), c), d), e), and f) and determining that the determined minimum value is a final slope limit value,
wherein in the operations e) and f), the summed value of the front wheel torque command and the rear wheel torque command is a value summing the front wheel torque command of the previous time step and the rear wheel torque command of the previous time step, and
the slope of the front wheel torque command and the slope of the rear wheel torque command are limited by the final slope limit value determined in the operations a) to g), which is the same slope limit value, in the mode transition process.

* * * * *